US012218426B2

(12) United States Patent
Yang et al.

(10) Patent No.: US 12,218,426 B2
(45) Date of Patent: Feb. 4, 2025

(54) LOW-PROFILE SINGLE-CHAIN BEAM-STEERABLE MMW LENS ANTENNA

(71) Applicant: Intel Corporation, Santa Clara, CA (US)

(72) Inventors: Tae Young Yang, Portland, OR (US); Seong-Youp John Suh, Portland, OR (US); Harry G. Skinner, Beaverton, OR (US); Ashoke Ravi, Portland, OR (US); Ofir Degani, Haifa (IL); Ronen Kronfeld, Shoham (IL)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 17/118,161

(22) Filed: Dec. 10, 2020

(65) Prior Publication Data

US 2022/0190482 A1 Jun. 16, 2022

(51) Int. Cl.
*H01Q 19/06* (2006.01)
*H01Q 1/42* (2006.01)
(Continued)

(52) U.S. Cl.
CPC ........... *H01Q 19/065* (2013.01); *H01Q 3/245* (2013.01); *H01Q 15/10* (2013.01); *H01Q 1/42* (2013.01); *H01Q 5/385* (2015.01)

(58) Field of Classification Search
CPC .......... H01Q 1/42; H01Q 3/245; H01Q 5/385; H01Q 15/02; H01Q 15/08; H01Q 15/10; H01Q 19/06; H01Q 19/062; H01Q 19/065
See application file for complete search history.

(56) References Cited

U.S. PATENT DOCUMENTS

2007/0296640 A1 12/2007 Colburn et al.
2012/0032836 A1* 2/2012 Shamim .............. H01L 23/5389 29/601

(Continued)

FOREIGN PATENT DOCUMENTS

| | | | |
|---|---|---|---|
| EP | 0498524 | 8/1992 | |
| WO | 2008061107 | 5/2008 | |
| WO | WO-2008061107 A2 * | 5/2008 | ............... H01Q 1/38 |

OTHER PUBLICATIONS

"European Application Serial No. 21198372.1, Response filed Jan. 27, 2023 to Extended European Search Report mailed Jun. 24, 2022", 8 pgs.

(Continued)

*Primary Examiner* — Dameon E Levi
*Assistant Examiner* — Leah Rosenberg
(74) *Attorney, Agent, or Firm* — Schwegman Lundberg & Woessner, P.A.

(57) ABSTRACT

An antenna module and communication device containing the antenna module are disclosed. The antenna module is disposed in a metal cavity. The antenna module includes a switched beam mm-wave antenna array having radiating elements separated by less than a wavelength of the radiating elements. The array is fed by a single transceiver chain. The array is disposed at the focal length of a low-profile mm-wave lens configured to steer the beam. A sub-10 GHz antenna is disposed closer to the opening of the cavity than the lens. The lens is a Fresnel Zone Plate lens having a focal length of less than about the wavelength of the beam, or a Saucer lens having shells of different refractive indexes and having a profile that is more than 6 times smaller than a Luneburg lens with a same focal length.

20 Claims, 25 Drawing Sheets

(51) Int. Cl.

| | |
|---|---|
| ***H01Q 3/24*** | (2006.01) |
| ***H01Q 5/385*** | (2015.01) |
| ***H01Q 15/10*** | (2006.01) |

(56) References Cited

U.S. PATENT DOCUMENTS

| | | | | |
|---|---|---|---|---|
| 2014/0077995 | A1 | 3/2014 | Artemenko et al. | |
| 2015/0091756 | A1* | 4/2015 | Casciato | H01Q 15/02 342/368 |
| 2020/0018874 | A1* | 1/2020 | Chisum | H01Q 15/10 |
| 2020/0021009 | A1* | 1/2020 | Huang | H01Q 9/42 |
| 2020/0091622 | A1 | 3/2020 | Turpin et al. | |
| 2020/0350680 | A1 | 11/2020 | Yang et al. | |
| 2022/0239007 | A1* | 7/2022 | Biswas | H01Q 3/2658 |

OTHER PUBLICATIONS

"European Application Serial No. 21198372.1, Partial European Search Report mailed Mar. 14, 2022", 13 pgs.

"European Application Serial No. 21198372.1, Extended European Search Report mailed Jun. 24, 2022", 13 pgs.

Ala-Laurinaho, "2-D Beam-Steerable Integrated Lens Antenna System for 5G E-Band Access and Backhaul", IEEE Transactions on Microwave Theory and Techniques, vol. 64, No. 7, (Jul. 2016), pp. 2244-2255.

Chi, Pei-Ling, "High-Gain Patch-Fed 3D-Printing Fresnel Zone Plate Lens Antenna for 60-GHz Communications", IEEE Antennas and Propagation Symposium, (2018), pp. 597-598.

Kwon, D, "Transformation Electromagnetics: An Overview of the Theory and Applications", IEEE Antennas and Propagation Magazine, vol. 52, No. 1, (Feb. 2020), pp. 24-46.

"European Application Serial No. 21198372.1, Communication Pursuant to Article 94(3) EPC mailed May 13, 2024", 7 pgs.

* cited by examiner $$\varepsilon_r^{th}(r) = \frac{\delta}{(\delta - 1)r^4 + 1}\left[2 - r^2\right]$$

$$\varepsilon_{r,i}^{opt} = 2\delta - (2i - 1)M \; i = 1,2,\cdots,N$$

$$r_i^{opt} = \sqrt{\frac{-\delta + \sqrt{\delta^2 + 4(\delta - 1)\left(\varepsilon_{r,i}^{opt} - M\right)\left(2\delta - \varepsilon_{r,i}^{opt} + M\right)}}{2(\delta - 1)\left(\varepsilon_{r,i}^{opt} - M\right)}}$$

$$where \; M = \frac{2\delta - 1}{2N + 1}$$

FIG. 14B

LOW-PROFILE SINGLE-CHAIN BEAM-STEERABLE MMW LENS ANTENNA

TECHNICAL FIELD

Aspects pertain to mm-wave communication systems. Some aspects relate to mm-wave communication systems that use phased array antennas. Some aspects relate to a single-chain mm-wave beam steerable lens antenna.

BACKGROUND

The use of various types of user devices (or user equipment (UE)), such as smart phones and tablets, continues to increase, as does amount of data and bandwidth being used by various applications, such as video streaming, operating on these UEs. In some situations, the UEs may communicate with a base station via the licensed bands (e.g., third-generation partnership project (3GPP) bands) using network resources. The UEs may alternately use the unlicensed (Wifi) bands to communicate. Relatively recently, additional mm-wave bands have been allocated for UE communication to support the anticipated demand for both high data rates and a high density of user devices in a particular geographical area. The relatively newly-released 60-GHz band in particular offers benefits and advantages including operation in the unlicensed band, which permits flexible deployment and removes the use of significant capital to obtain a spectrum license. In addition, the 60-GHz band offers secure and virtually interference-free operation due to scoped channel propagation characteristics and the use of steerable narrow beams. The 60-GHz band also offers high level of frequency re-use with 7 GHz of available spectrum. However, issues arise with the advent of any new technology, including band use in the 60-GHz band.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 14B illustrates Saucer lens equations in accordance with some aspects;

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
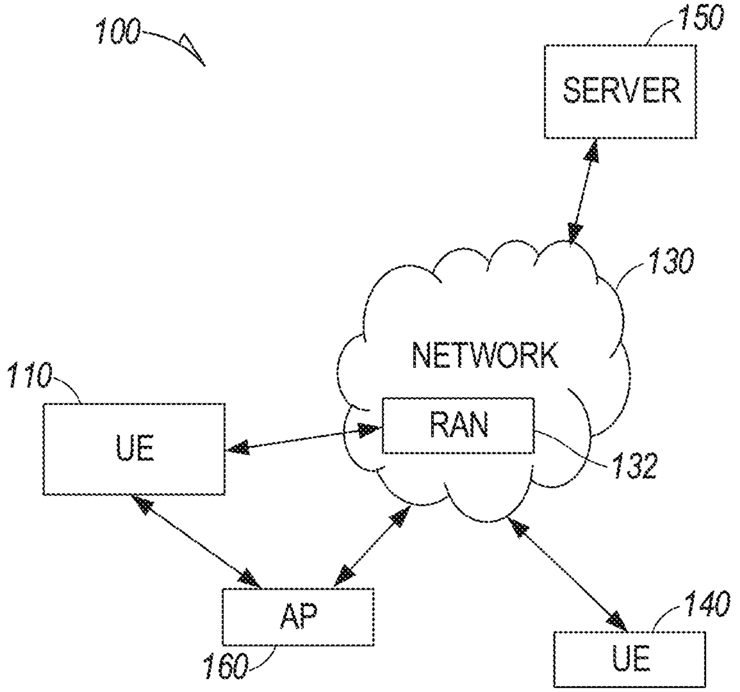
FIG. 1 is a functional block diagram illustrating a system according to some aspects.

FIG. 1 is a functional block diagram illustrating a system according to some aspects. The system 100 may include multiple UEs 110, 140. In some aspects, one or both the UEs 110, 140 may be communication devices that communicate with each other directly (e.g., via P2P or other short range communication protocol) or via one or more short range or long range wireless networks 130, The UEs 110, 140 may, for example, communicate wirelessly locally, for example, via one or more random access networks 132, WiFi access points (APs) 160 or directly using any of a number of different techniques and protocols, such as WiFi, Bluetooth, or Zigbee, among others. The random access networks 132 may contain one or more (BSs) such as evolved NodeBs (eNBs) and $5^{th}$ generation NodeBs (gNBs) and/or micro, pico and/or nano base stations.

The UEs 110, 140 may communicate through the network 130 via Third Generation Partnership Project Long Term Evolution (3GPP LTE) protocols and LTE advanced (LTE-A) protocols, 4G protocols or 5G protocols. Examples of UEs 110, 140 include, but are not limited to, mobile devices such as portable handsets, smartphones, tablet computers, laptop computers, wearable devices, sensors and devices in vehicles, such as cars, trucks or aerial devices (drones). In some cases, the UEs 110, 140 may communicate with each other and/or with one or more servers 150. The particular server(s) 150 may depend on the application used by the UEs 110, 140.

The network 130 may contain network devices such as a gateway (e.g., a serving gateway and/or packet data network gateway), a Home Subscriber Server (HSS), a Mobility Management Entity (MME) for LTE networks or an Access and Mobility Function (AMF), User Plane Function (UPF), Session Management Function (SMF) etc., for 5G networks. The network 130 may also contain various servers that provide content or other information related to user accounts.

Figure 2:
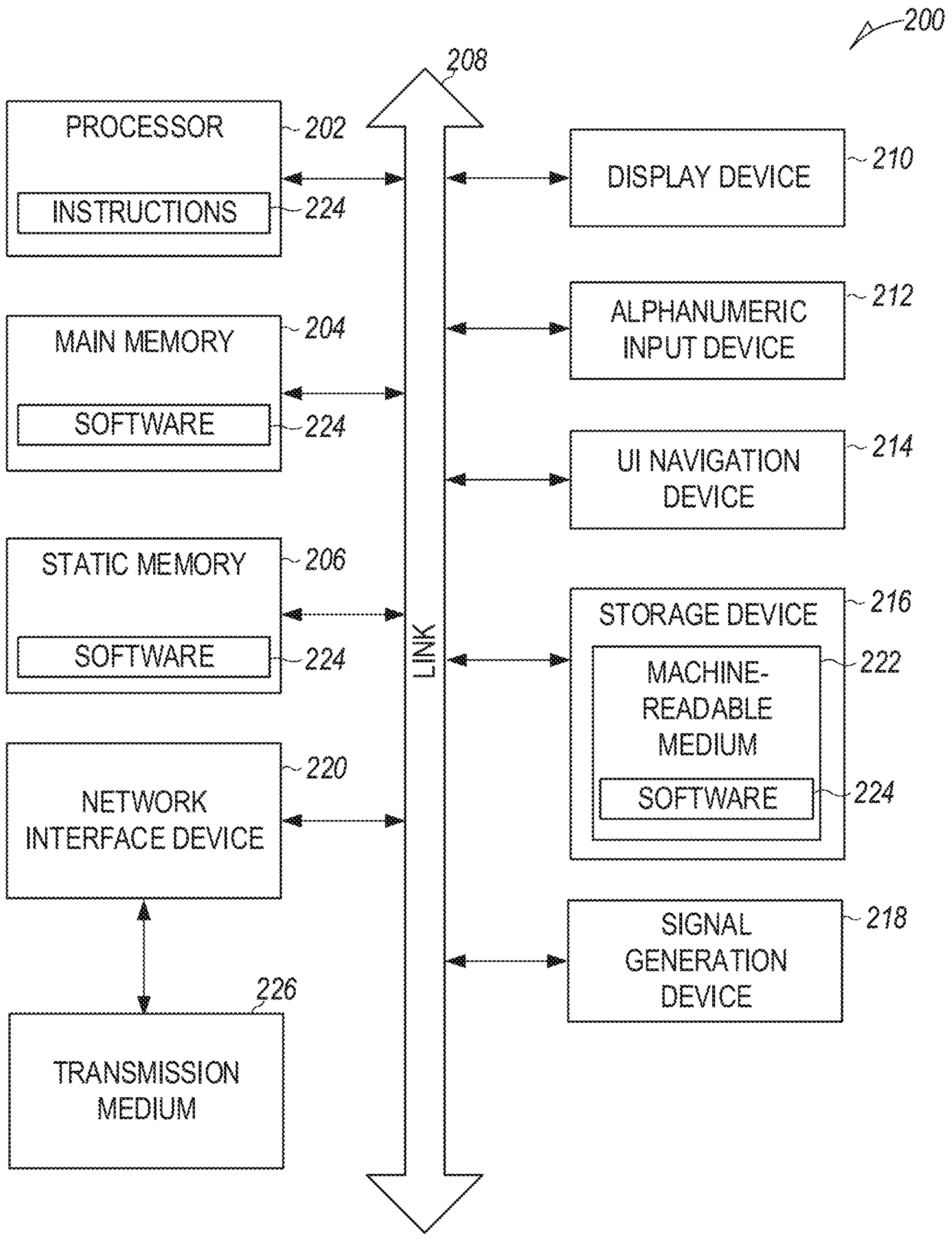
FIG. 2 illustrates a block diagram of a communication device in accordance with some aspects.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208, The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g. infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HITTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as WiFi. IEEE 802.16 family of standards known as WiMax, IEEE 802.15.4 family of standards, a Long Term Evolution (LTE) family of standards, a Universal Mobile Telecomrunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is pail of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC, digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Devices that communicate using the 60 GHz band (57-66 GHz) mm-wave band may include devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards. Some embodiments may be used in conjunction with one or more types of wireless communication signals and/or systems, for example, Radio Frequency (RF), Tnfra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (CPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth, ZigBee, or the like.

As above, with the advent of mm-wave systems has engendered issues. One such issue arises in the context of antenna use. In particular, a phased array antenna approach may be used for mm-wave systems as in wireless local access network (WLAN) solutions, such as WiFi solutions, the link may be asymmetric; that is, more features and higher complexity may be provided on the AP while the UE may be designed for low cost and small form-factor. In the mm-wave context, this translates to higher directional gain (e.g., larger arrays) on the AP whereas the UE may support a smaller directivity (e.g. ~10 dB) and coarse bean width and resolution (~2-3 bits). In a phased array antenna system, multiple antennas may be used to simultaneously transmit the same signal with different phases to steer the resulting beam from the array. A phased array antenna may allow the UE to meet range specifications by increasing the directional antenna gain. However, use of a phased array may result in expensive solutions, which have resulted in low adoption rates (e.g., WiGig). The phase array solution power consumption is also relatively high due to the multiple radio frequency (RF) chains used for the individual antennas, as well as lossy components within the array, such as phase shifting and/or splitting/combining elements.

The use of phased array antenna may also increase the difficulty in algorithm implementation, such as digital predistortion (DPD), due to variance over the chains and impracticality of feeding independent correction per chain. This, in turn, may limit the performance of a phase array transceiver by forcing each transceiver to operate at either larger back-off or further increase the power dissipated in each chain to achieve better linearity. For mm-wave WiFi applications specifically, the system may also be designed to operate as an additional offload frequency spectrum (in a manner low-band and high-band operate) from the protocol to the radio frequency integrated circuit (RFIC) to guarantee backward compatibility for legacy sub-7 GHz WiFi standards.

In a phased array antenna transceiver, a relatively large variation in gain and saturated power, as well as amplitude modulation (AM)/AM and AM/phase modulation (PM) may be presented between different Tx chains and power amplifiers (PAs). Different PAs in the array see different Voltage Standing Wave Ratios (VSWRs), which may affect the response of the PAs. Moreover, the "effective" VSWR seen by a PA may be dependent on leakage and interaction between antennas in the array, which again may vary as the beam is being steered. Effective DPD also uses a feedback loop from each PA in the array to apply joint estimation and correction, which adds significant complexity and cost. Analog beamforming may also be limited to a single DPD correction value for all Tx chains and PAs which may introduce loss to the DPD algorithm. A sectorized directional antenna may moreover occupy a large physical area to accommodate the array since the individual elements may be designed and spaced for isolation.

Accordingly, a switched beam array integrating a mmW lens and focal source antenna array may be used to address the increased costs for a phase array antenna system. The link asymmetry may be exploited to reduce silicon and bill of material costs and reduce power dissipation of the device in which the array is located (UE or AP) through the use of a single RF chain switched to/from a small number (e.g., 4-8) radiating elements coupled into a lens. That is, a single-chain mm-wave beam steerable lens antenna may be used as described below.

While in certain devices a lens may be used to provide desired radiation characteristics, the lens thickness and/or the long focal length of the lens may be problematic for low-profile mobile applications, such as laptops, tablets, and smart phones. In the embodiments described below, the single-chain transceiver that can be switched to/from multiple antenna elements may be coupled with a low-profile mm-wave lens to achieve a desired beam gain and steerability. The low-profile mm-wave lens may be either a diffractive or optical lens. The diffraction-based mmW lens can be implemented on the same printed circuit board (PCB) of the module while optics-based lens can be implemented with low cost plastic molding or 3D printing. This arrangement may avoid the use of multiple RF chains and lossy phase shifters, simplify the DPD to enhance the performance and efficiency of the transceiver in addition to providing guaranteed backward comparability to legacy WiFi solutions. Note that the various electronic components of the transceiver chain (e.g., amplifiers, filters, isolators, mixers, etc. . . . ) are not shown for convenience.

Figure 3:
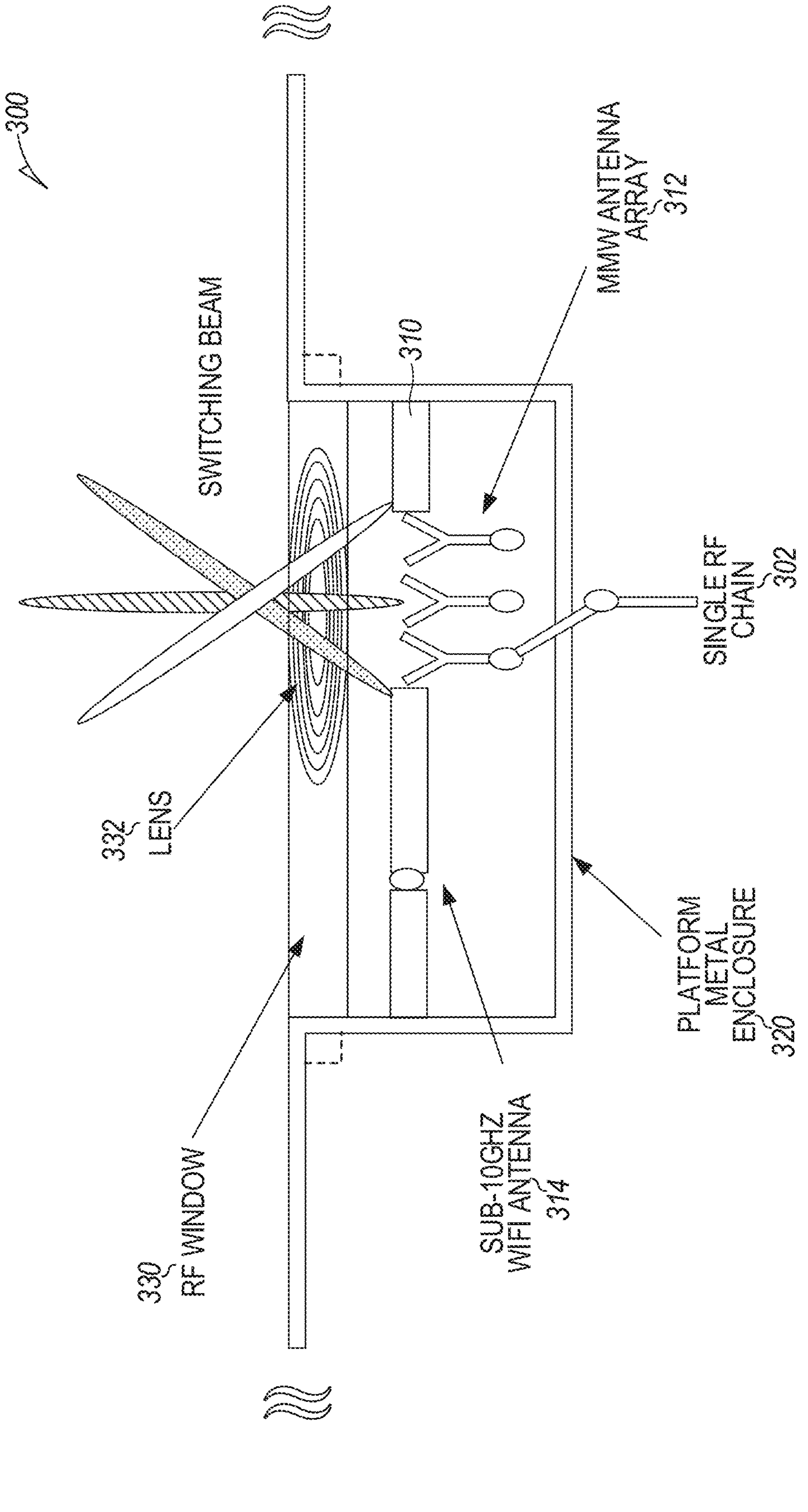
FIG. 3 illustrates a single-chain beam-steerable mm-wave optical-lens antenna in accordance with some aspects.

FIG. 3 illustrates a single-chain beam-steerable mm-wave optical-lens antenna in accordance with some aspects. In particular, in the cross-sectional view shown in FIG. 3, the antenna 300 includes multiple antennas contained within a metal cavity 320. As shown, the metal cavity 320 (also referred to as a platform metal enclosure) includes a PCB 310 containing or on which are mounted a mm-wave antenna array 312 having multiple antennas and a WiFi antenna 314. The PCB 310 may be completely retained in a recess in the metal cavity 320. The metal cavity 320 may be formed in the shape of a circular or rectangular cap that forms the recess and a rim that extends from the cap at the edge of the cap. The rim may be, for example, part of a mobile phone case. In other embodiments, as shown by the dashed lines, the run may be stepped and the PCB 310 may fit within the step, being physically stopped by the lower portion of the step. In this case, the ends of the PCB 310 may be attached to the step via an adhesive, for example.

The mm-wave antenna array 312 and WiFi antenna 314 may be designed to support different communication wavelength ranges. In some embodiments, the WiFi antenna 314 may be designed to communicate over one or more sub-10 GHz frequencies. In some embodiments, the WiFi antenna 314 may be designed to communicate over one or more sub-7 GHz frequencies to enable communication with legacy WiFi networks. As shown in FIG. 3, the WiFi antenna 314 may be integrated within the PCB 310, and may be, for example, one or more microstrip antennas or radiating elements that extend between conductive layers of the PCB 310.

The mm-wave antenna array 312 may be fed by a single RF chain 302. The single RF chain 302 may automatically switch between the individual antennas of the mm-wave antenna array 312. The single RF chain 302 may also connect to the WiFi antenna 314 (e.g., via a switch) to feed signals to and receive signals from the WiFi antenna 314. In other embodiments, a separate (from the single RF chain 302) external connection may be used to feed signals to and receive signals from the WiFi antenna 314.

The metal cavity 320 may be sealed using an RF window 330. At least a portion of the RF window 330 may act like a radome and protect the structures disposed within the metal cavity 320. The RF window 330 may be formed from a material that permits propagation of RF signals at the wavelength of the WiFi antenna 314 without significant degradation (e.g., a loss of about 0.5 dB). The material may be optically transparent or not. For example, the material may permit propagation of RF signals at the wavelength of the mm-wave antenna array 312 without significant degradation. As shown, the RE window 330 may be disposed within the recess of the metal cavity such that the RF window 330 is separated from the PCB 310 and the upper edge of the RF window 330 is level with (or a few mm below) the rim of the metal cavity 320 to reduce the overall height profile of the antenna 300.

An optical lens 332 may be fabricated on or disposed in the RF window 330. In some embodiments, the lens 332 may be limited to a portion of the RF window 330 associated with the mm-wave antenna array 312. The lens 332 may be substantially any shape, as described in more detail below, to provide a desired amount of steering of the beam from the mm-wave antenna array 312. The mm-wave antenna array 312 may be disposed at or near (e.g. within about 0.1-0.2 mm of) the focal length of the lens 332. The lens 332 may be of about the same dimension (e.g., slightly larger than) as the mm-wave antenna array 312 as shown and described in more detail below. In some embodiments, the lens 332 may be formed of a material, such as plastic, that permits propagation of RF signals at the wavelength of the mm-wave antenna array 312 without significant degradation. The lens 332 may act like an RF window at frequencies below 10 GHz and thus not appreciably affect propagation of signals from/to the WiFi antenna 314. In other embodiments, the lens 332 may be formed from a combination of different materials including metals.

Figure 4:
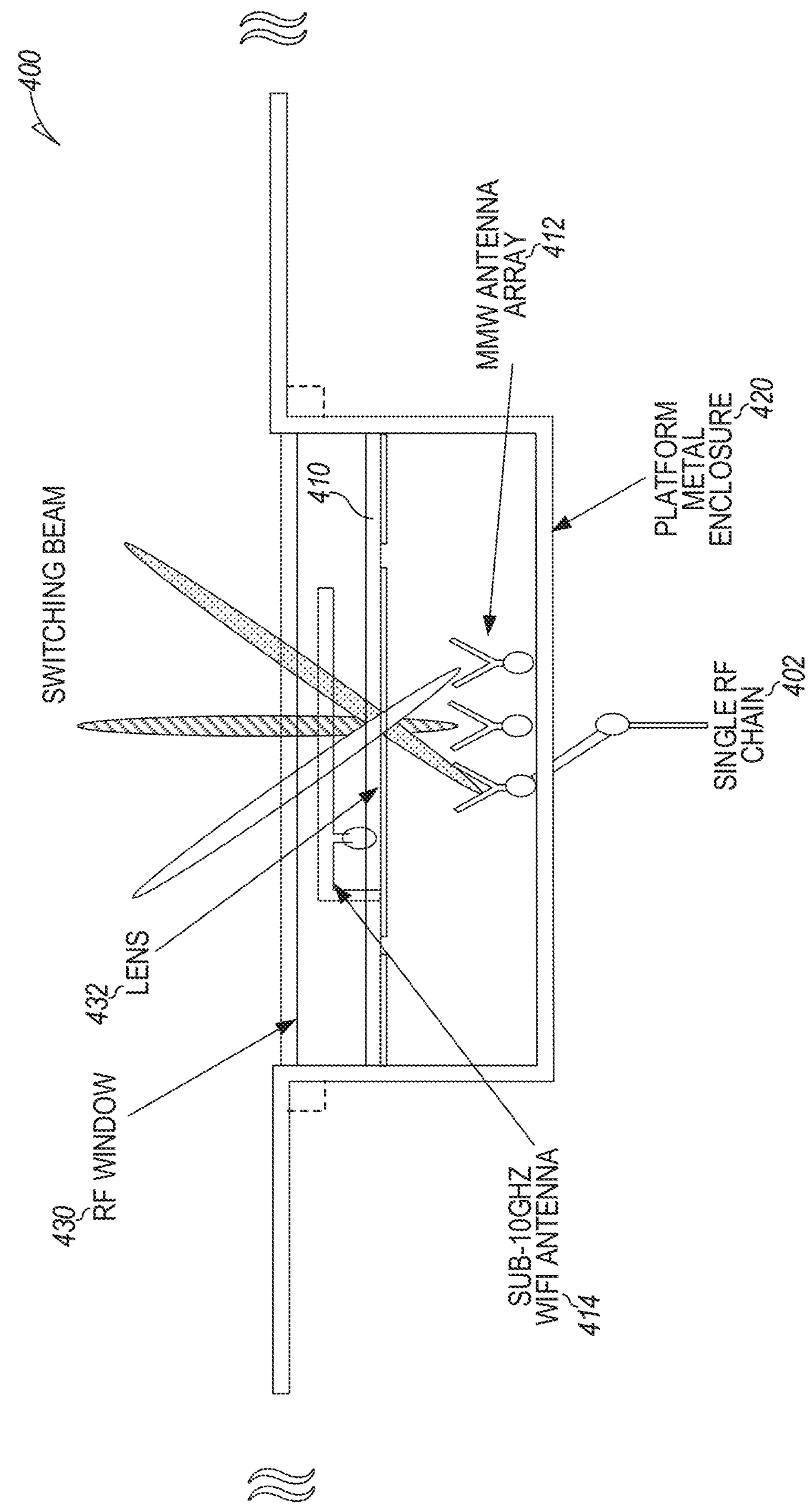
FIG. 4 illustrates another single-chain beam-steerable mm-wave diffractive-lens antenna in accordance with some aspects.

FIG. 4 illustrates another single-chain beam-steerable mm-wave diffractive-lens antenna in accordance with some aspects. The single-chain beam-steerable mm-wave lens antenna 400 shown in FIG. 4 is similar to the single-chain beam-steerable mm-wave lens antenna shown in FIG. 3. As shown in the cross-sectional view of FIG. 4, the antenna 400 includes multiple antennas contained within a metal cavity 420. As shown, the metal cavity 420 (also referred to as a platform metal enclosure) includes a PCB 410 containing or on which are mounted a mm-wave antenna array 412 having multiple antennas and a WiFi antenna 414. The mm-wave antenna array 412 and WiFi antenna 414 may be designed to support different communication wavelength ranges. The PCB 410 may be completely retained in a recess in the metal cavity 420, The metal cavity 420 may include (for example) a circular or rectangular cap that forms the recess and a rim that extends from the cap at the edge of the cap. The rim may extend from the cap, for example, in directions that mirror the shape of the cap (e.g., if the cap is circular, in a ring from the cap).

In some embodiments, the WiFi antenna 414 may be designed to communicate over one or more sub-10 GHz frequencies. In some embodiments, the WiFi antenna 414 may be designed to communicate over one or more sub-10 GHz frequencies to enable communication with legacy WiFi networks. As shown in FIG. 4, the WiFi antenna 414 may be disposed on the PCB 410, and may be, for example, one or more planar antennas (e.g., Planar Inverted-F antenna (PIFA)) or radiating elements. Each planar antenna may include a conductive sheet selectively designed to transmit and receive wireless signals in the sub-10 GHz frequency band and may be formed on and/or over the PCB 410, the latter of which is shown in FIG. 4. For example, the planar antenna may be disposed may be developed by defining metal patterns on one or more conductive layers of the PCB 410. Each planar antenna may include one or more of a patch, slot, spiral, or any other suitable antenna structure to provide elevation beam coverage. The planar antenna extending from the PCB 410 may be fed from a microstrip line and grounded by a ground line.

The mm-wave antenna array 412 may be fed by a single RF chain 402. The single RF chain 402 may automatically switch between the individual antennas of the mm-wave antenna array 412. The single RF chain 402 may also connect to the WiFi antenna 414 (e.g., via a switch) to feed signals to and receive signals from the WiFi antenna 414. In other embodiments, a separate (from the single RF chain 402) external connection may be used to feed signals to and receive signals from the WiFi antenna 414.

The metal cavity 420 may be sealed using an RF window 430. As in FIG. 4, the RF window 430 may be formed from a material that permits propagation of RF signals at the wavelength of the WiFi antenna 414 and at the wavelength of the mm-wave antenna array 412 without significant degradation while protecting the structures within the metal cavity from external influences, such as liquid ingress. As shown, the RF window 430 may be disposed within the recess of the metal cavity such that the RF window 430 is separated from the PCB 410 and the WiFi antenna 414 (which and the upper edge of the RF window 430 is level with (or a few tenths of a mm below) the rim of the metal cavity 420 to reduce the overall height profile of the antenna 400. In other embodiments, the RF window 430 may be disposed within a step in the metal cavity 420 as described above.

In some embodiments, such as that shown in FIG. 4, the lens 432 may be disposed between the mm-wave antenna array 412 and the WiFi antenna 414, in which case, the lens 432 may not affect communication of the WiFi antenna 414 through the RF window 430. The lens 432 may be limited to a portion of the PCB 410 associated with the mm-wave antenna array 412 or may cover essentially the entire PCB 410. The lens 432 may be substantially any shape to provide a desired amount of directionality of the beam from the mm-wave antenna array 412, may be separated from the mm-wave antenna array 412 by about the focal length of the lens 432, and may be of sufficient dimensions to provide focusing of signals from the mm-wave antenna array 412.

In both the arrangements of FIGS. 3 and 4, both the sub-10 GHz (or sub-7 GHz) WiFi antenna 314, 414 and mm-wave antenna 312, 412 are inside the metal cavity 320, 420 and may be connected to a radio head as a part of a distributed radio system. In different embodiments, the WiFi antenna 314, 414 and mm-wave antenna 312, 412 may either be integrated on the same structure (e.g., PCB) or be provided on different structures; similarly, the feeds to the WiFi antenna 314, 414 and mm-wave antenna 312, 412 may be integrated together or separate. This may permit mitigation or reduction of potential RF interference (RFI) between the antenna system and other circuits (e.g., amplifiers, filters) inside the computing platform. The use of a single chain compared to a phased array where multiple bulky RF sections are present, and the phase shifters and splitter/combiner networks are large reduces the cost.

The lens 332, 432 can be implemented as either an optics-based (refractive) lens or as a diffraction plate. In some embodiments, the lens 332, 432, whether optics-based or diffraction-based, can be implemented using different materials. In other embodiments, the lens 332, 432 can be implemented using, for example, the same material as the RF window 330, 430. In this latter embodiment, the index of refraction may be controlled by varying the number of air pockets (holes) in the material used to form the RF window 332, 432. In this case, the hole density may change at discrete intervals (e.g., different rings for the diffraction plate or different shells for the Lundberg lens, below). The implementations shown in FIGS. 3 and 4 permit both the WiFi antenna 314, 414 and mm-wave antenna 312, 412 may be integrated in the same form factor as a non-lensed solution for the WiFi antenna 314, 414 alone.

Figure 5:
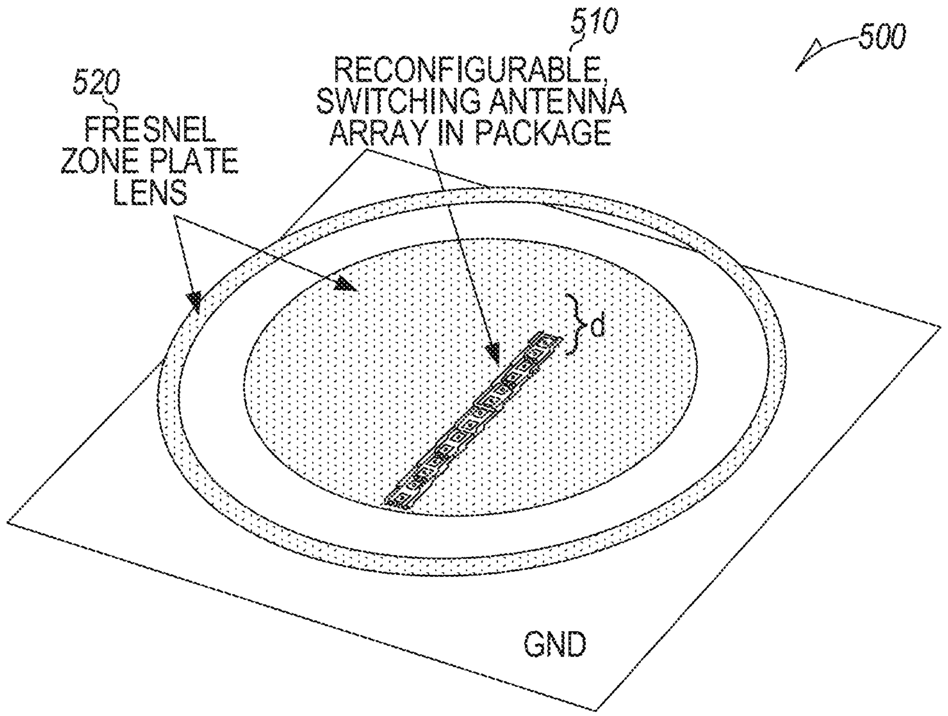
FIG. 5 illustrates an antenna structure in accordance with some aspects.

FIG. 5 illustrates an antenna structure in accordance with some aspects. As shown, the antenna structure 500 contains a reconfigurable switching antenna array 510 (shown as 312, 412 in FIGS. 3 and 4). The reconfigurable switching antenna array 510 is disposed on a ground plane of a PCB. The reconfigurable switching antenna array 510 may transmit and receive signals at mm-wave (60 GHz). In some embodiments, the radiating elements of the reconfigurable switching antenna array 510 may be activated individually to provide the mm-wave signal rather than as being part of a phased array.

The antenna structure 500 contains a diffraction lens 520 to focus the mm-wave signal from the activated radiating element of the reconfigurable switching antenna array 510. The diffraction lens 520 may be a Fresnel Zone Plate (FZP) lens. The reconfigurable switching antenna array 510 may be disposed at or near (within a few tenths of a mm of) the near-field focal point of the FZP lens 520. The FZP lens 520 can be formed from a metal (such as Al) to focus the mm-wave signals transmitted by each antenna of the reconfigurable switching antenna array 510. The FZP lens 520 may contain a set of concentric rings that alternate between being opaque and transparent to the radiation of a desired frequency impinging on the FZP lens 520 (in this case, mm-wave frequencies), diffracting around the opaque zones and providing constructive interference at the desired focus.

The FZP lens 520 can be integrated into the packaging and module through low cost plastic molding (e.g., on the RF window), through 3D printing techniques, or patterned using sputtering and/or other deposition processes. For example, the FZP lens 520 may be created using traces on the PCB to create the lensing effect and therefore incur a negligible cost overhead. While the FZP lens 520, 620 may be integrated with the focal source antenna array in the multi-layer PCB/package, in other embodiments the FZP lens 520, 620 can be integrated in the metal cover of a laptop computer or mobile device.

In some embodiments, the focal length d of the FZP lens 520 may be about 4.9 mm (about the wavelength of the beam from the radiating elements of the reconfigurable switching antenna array 510), and the reconfigurable switching antenna array 510 may lie essentially at the focal length below the FZP lens 520. That is, in some embodiments, the focal length d of the FZP lens 520 may be within about 0.1-0.2 mm of 4.9 mm. In other embodiments, the focal length may be able to be further reduced, which may be attractable for mobile devices such as laptops and tablets, but depend on more precise positioning between the FZP lens 520 and the reconfigurable switching antenna array 510. The FZP lens 520 can have a circular, ovular or rectangular shape, for example.

In some embodiments, the reconfigurable switching antenna array 510 may be smaller than the center circle of the FZP lens 520. In other embodiments, the reconfigurable switching antenna array 510 may be larger than the center circle of the FZP lens 520 but smaller than the entire FZP lens 520. However, the reconfigurable switching antenna array 510 may not be larger than the entire FZP lens 520 as the size of the reconfigurable switching antenna array 510 is related to the field-of-view (FOV), i.e., a larger (longer) array will have a larger FoV and thus a larger FZP lens may be used to focus and steer the beam.

Figure 6:
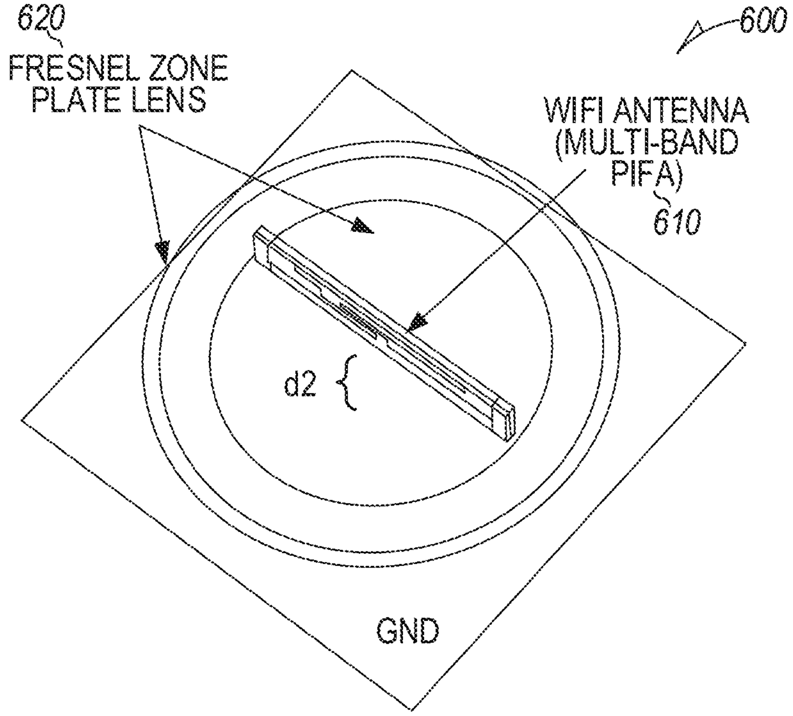
FIG. 6 illustrates another antenna structure in accordance with some aspects.

Although not shown in FIG. 5, the WiFi antenna can be provided over the FZP lens 520. Such a structure is shown in FIG. 6, which illustrates another antenna structure in accordance with some aspects. In addition to the reconfigurable switching antenna array package (not shown in FIG.

6) and the FZP lens 620, a WiFi antenna (sub-10 GHz wave antenna/sub-7 GHz wave antenna) 610. The WiFi antenna 610 may be located on top of the FZP lens 620 as shown in FIG. 6 (i.e., closer to the RF window (not shown), rather than between (or in) the PCB and the FZP lens 620. The WiFi antenna 610 may be located a distance d2 above the FZP lens 620. The distance d2 may be selected such that the overall structure is within the form factor of the overall antenna package.

The WiFi antenna and mmW lens antenna may operate essentially independently. One estimate of insertion loss attributable to the FZP lens 520, 620 is less than 0.25 dB when the FZP lens 520, 620 is implemented as a thin metal pattern.

The FZP lens 520, 620 shown in FIGS. 5 and 6 includes a relatively large circular center region surrounded by a thin ring of the same material forming the center region. As shown, the diameter of the center region is greater than 20× the thickness of the ring, although this may different dependent on the desired diffraction properties. Moreover, the relative sizes may be different from that shown in FIG. 6. For example, the diameter of the circular center region may be comparable to or relatively thinner than by the surrounding ring, Although only a single ring is shown, multiple rings may be provided having a uniform thickness or one or more may have different thicknesses.

In some embodiments, the solid (metal) inner circle may cover more than 75% of the focal-source switching array area at an extremely small focal length (<5 mm). The size of the inner circle may provide a sufficient area to place a WiFi antenna 610 and offer seamless integration of sub-10-GHz and mmW WiFi antennas. In some embodiments, the dimensions of the FZP lens 620 may be reduced and any air-gap between the FZP lens 620 and the WiFi antenna 610 eliminated (i.e., d2 may be 0).

The use of the FZP lens 520, 620 described above may thus result in a lens with a focal length that is significantly less than other diffraction lenses. One reason for this is that lens design equations for other diffraction lenses are based on far-field conditions, i.e. lens is located at a far-field distance (>2*(largest dimension in lens)$^2$/wavelength)—otherwise, the lens cannot coherently combine incoming waves and results in losing its ability to focus the beam. In other words, such diffraction lenses are placed at a far field distance from the antenna array (focal length>>wavelength) while the FZP lens 520, 620 can be located at much smaller focal length from the antenna array. In some embodiments, the focal length is less than about 2× the mm-wave wavelength. In other embodiments, the focal length is about or less than the wavelength. In particular, the FZP lens 520, 620 may have a focal length at 60 GHz more than about 4 times smaller than that of other diffraction lenses.

As above, the FZP lens 520, 620 shown in FIGS. 5 and 6 has one large ring/center with a small number of rings surrounding the large ring (as shown 1 ring), a configuration that is enabled due to the proximity of the FZP lens 520, 620 to the antenna array. For a diffraction lens disposed at a far-field distance from the antenna array, several additional rings and a larger area (due to higher spill-over loss) may be employed to achieve a similar performance. Such a lens and focal length may be much too large (both in overall area and distance from the antenna array) to use in mobile applications.

Figure 7A:
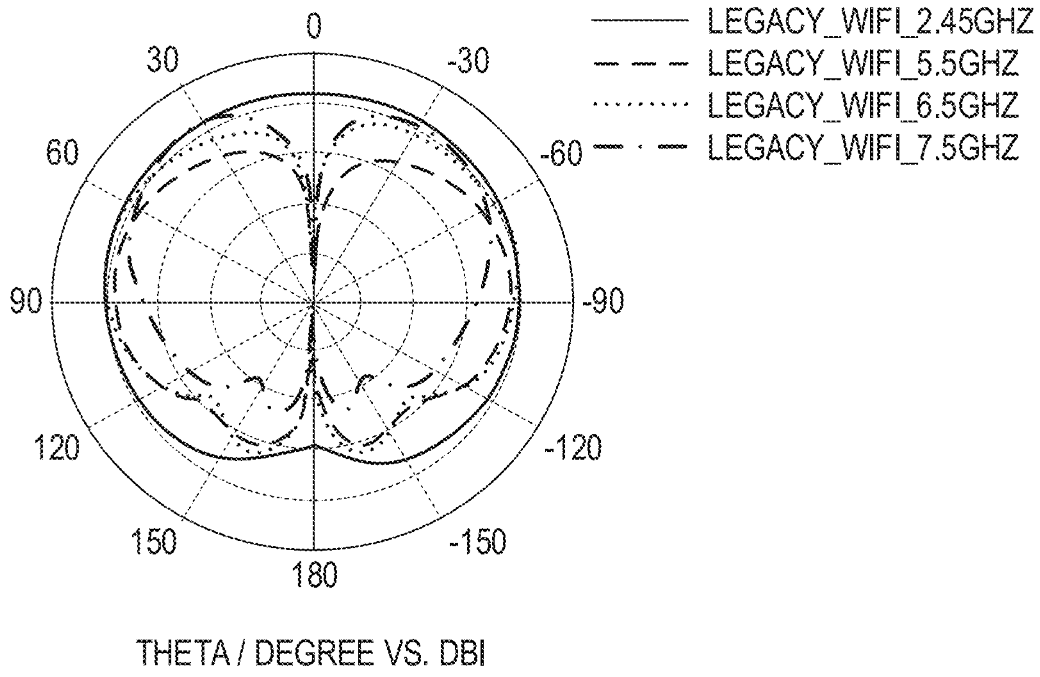
FIG. 7A is an elevation radiation pattern of an antenna structure in accordance with some aspects.
Figure 7B:
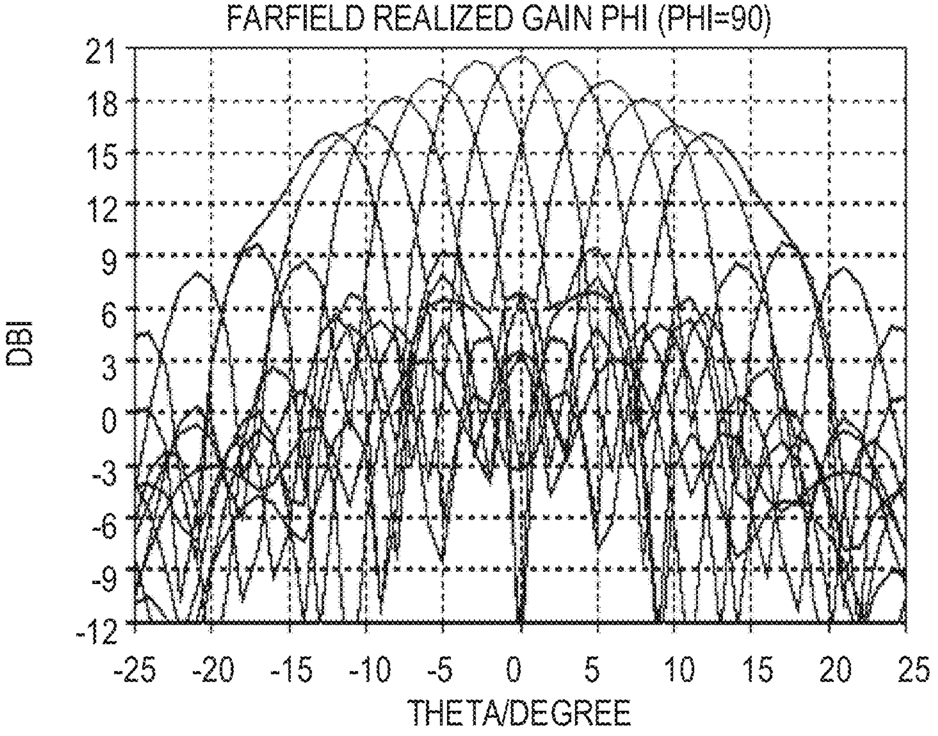
FIG. 7B is far field gain and scanned beams of the antenna structure of FIG. 7A in accordance with some aspects.
Figure 7C:
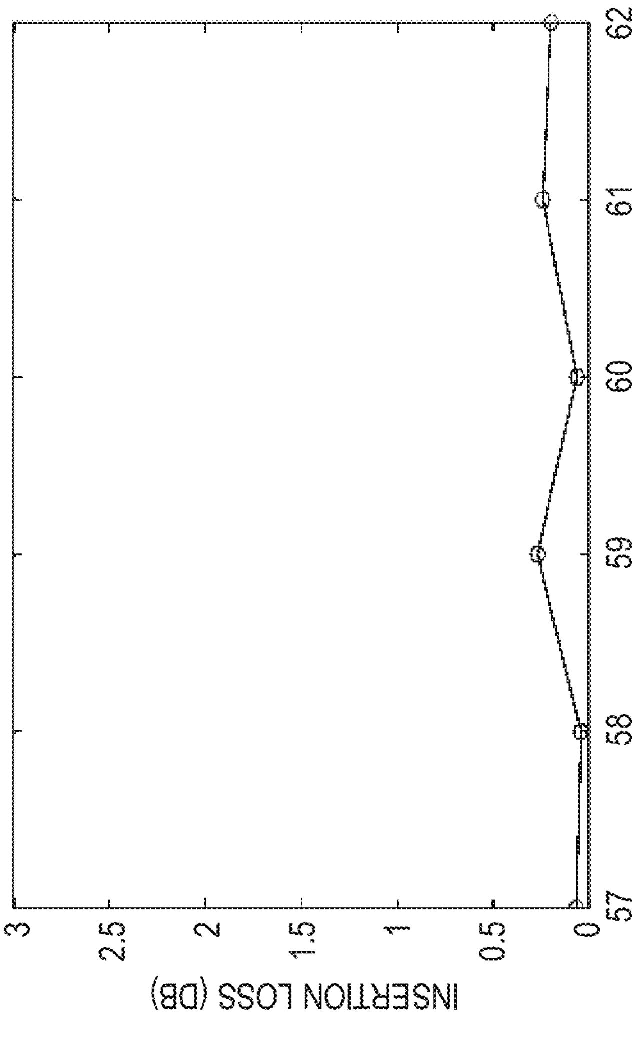
FIG. 7C is insertion loss of the lens structure of FIG. 5 in accordance with some aspects.

FIGS. 7A-C show simulated aspects of the antenna structure shown in FIGS. 5 and 6. In particular, FIG. 7A is an elevation radiation pattern of an antenna structure in accordance with some aspects, FIG. 7B is far-field gain and scanned beams of the antenna structure of FIG. 5 in accordance with some aspects, and FIG. 7C is the insertion loss of the lens structure of FIG. 5 in accordance with some aspects. FIG. 7A shows simulated elevation radiation patterns at sampled frequencies of the WiFi (PIFA) antenna located on the diffractive lens. As shown, the lowest frequency (2.45 GHz) exhibits a substantially uniform distribution, with the other frequencies exhibiting a butterfly-like distribution. FIG. 7B shows mm-wave (60-GHz) beam scanning using the diffractive lens and switching aperture-coupled patch antenna array. FIG. 7B shows the far-field gain of FZP lens when a single radiating element of the mm-wave antenna array is activated, for each radiating element (the remaining radiating elements in the array are deactivated) to provide beam steering of the radiation from the array. That is, the beam scanning was achieved by selecting one of the element antenna in the array. The centermost radiating element of the array exhibits the largest gain, with the gain decreasing 3 dBi at about 8° from perpendicular. The FZP and focal source performance is the same for both FIG. 5 (no sub-10-GHz WiFi antenna is provided) and FIG. 6 (with sub-10-GHz WiFi antenna). In other words, the FZP+focal source performance is independent of the existence of the sub-10-GHz WiFi antenna. FIG. 7C shows the estimated insertion loss of the diffractive lens at frequencies around 60 GHz. As shown, the insertion loss varies from about 0.05 dB to about 0.25 dB from 57 GHz to 62 GHz.

In phased arrays, in order to direct the beam, the individual radiating elements are disposed at least a half wavelength apart. The wavelength at 60 GHz is about 5 mm which means the typical distance separating each radiating element is about 2.5 mm. If the distance is less than half wavelength, there may be noticeable mutual coupling between the radiating elements, which may result in a narrow operational bandwidth and also distort the beam pattern during scanning. On the other hand, if the distance is more than a half wavelength, a grating lobe may be introduced into a visible region in the antenna pattern domain. Thus, a half wavelength may be considered as an optimum distance between the radiating elements. In contrast to phased arrays however, by using lensing, the radiating elements can be placed closer to each other (a fraction of the wavelength) resulting in a more compact structure. This is to say that the use of a lens is able to provide a relaxed directivity in addition to resulting in a smaller lens aperture and thickness (z-height) being able to be used. For example, to meet a gain of about 12 dBi and a beam width of about 30°, the lens can fit in about a 7 mm×7 mm aperture.

Figure 8:
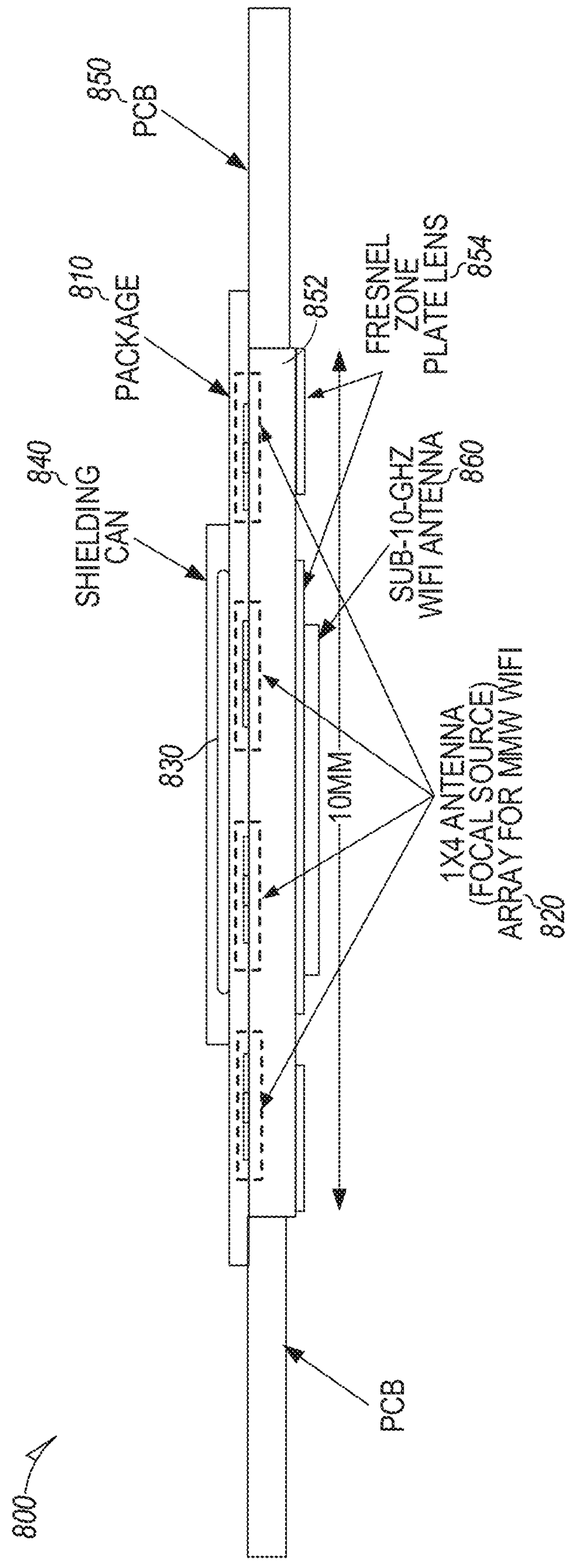
FIG. 8 is an antenna module in accordance with some aspects.

FIG. 8 is an antenna module in accordance with some aspects. To obtain beam coverage in two dimensions (E and H planes), the module 800 can be implemented as shown. FIG. 8 in particular illustrates a cross-sectional view of the antenna module 800. The antenna module 800 shown in FIG. 8 contains a package 810 for the mm-wave radio head and radiating elements 820 disposed on the package 810. The radiating elements 820 are configured to radiate at mm-wave frequencies and are driven by a mm-wave radio head 830, which is encapsulated in a metal shielding can 840 to provide electromagnetic interference shielding for the circuitry in the mm-wave radio head 830 (e.g., power amplifiers, filters, etc). The shielding can 840 is disposed around the mm-wave radio head 830.

The mm-wave radiating elements 820 are supported by the package 810, through which connections (not shown) to the mm-wave radio head 830 are used to drive the mm-wave radiating elements 820. The edges of the package 810 are attached to a PCB 850. The mm-wave radiating elements 820 are disposed to radiate towards a FZP lens 854 and may be separated from the FZP lens 854 by about the focal length of the FZP lens 854 using air or a dielectric (e.g., plastic) layer 852 that is substantially permeable at the mm-wave and WiFi frequencies. If an air gap is used, the FZP lens 854 may be supported, for example, by a thin dielectric layer attached to the opposite side of the PCB 850 as the mm-wave radiating elements 820. The sub-10 GHz WiFi antenna 860 may be disposed on the opposite side of the FZP lens 854 as the dielectric layer 852/mm-wave radiating elements 820. The dimensions of the dielectric layer 852, in some embodiments, may be on the order of about 100 $mm^2$ and thus the FZP lens 854 and sub-10 GHz WiFi antenna 860 and mm-wave radiating elements 820 may fit in a window of approximately 10 mm×10 mm. Note that as several mm-wave radiating elements 820 are disposed linearly within the 10 mm, the distance between the mm-wave radiating elements 820 may be substantially less than a wavelength of the 60 GHz mm-wave radiation.

To fabricate the antenna module shown in FIG. 8, the FZP lens 854 is attached to the PCB 850 containing circuitry and interconnects and/or to a dielectric layer 852 disposed within the PCB 850. A sub-10 GHz WiFi antenna 860 is disposed on and centered within the FZP lens 854. The sub-10 GHz WiFi antenna 860 is electrically connected to driver circuitry in the PCB 850, for example. A package 810 containing mm-wave radiating elements 820 is disposed on the other side of the dielectric layer 852 as the FZP lens 854 at the focal length of the FZP lens 854. The mm-wave radiating elements 820 are connected to a mm-wave radio head 830 disposed within a shielding can 840 to shield the mm-wave radio head 830 from EMI. The entire antenna module 800 may be inserted into a metal cavity of a mobile device case and sealed with an RF window.

Figure 9A:
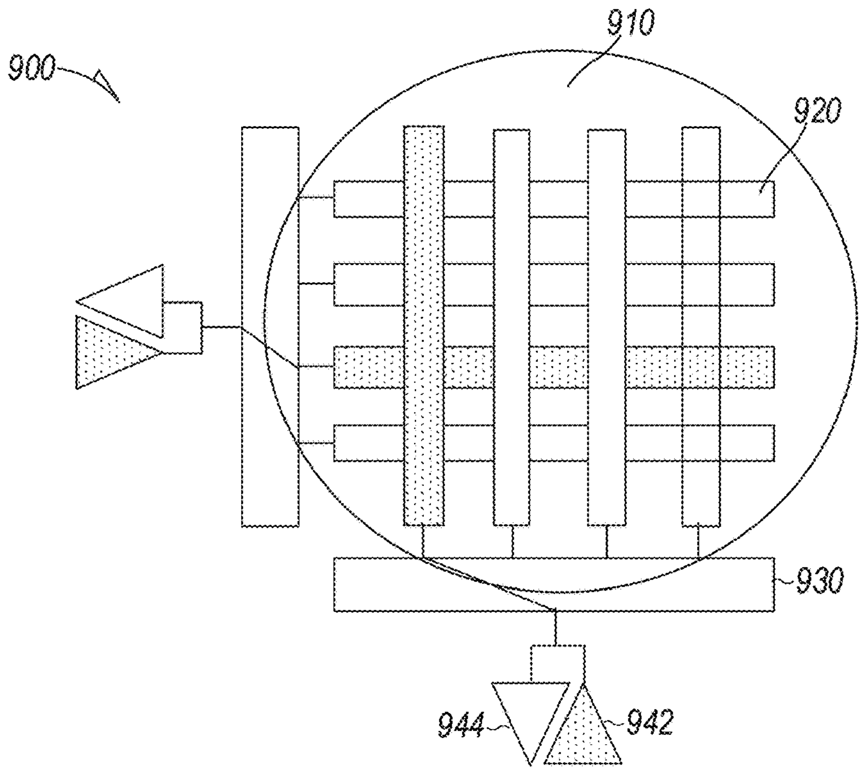
FIG. 9A illustrates two-dimensional (2-D) scanning in an antenna module in accordance with some aspects.
Figure 9B:
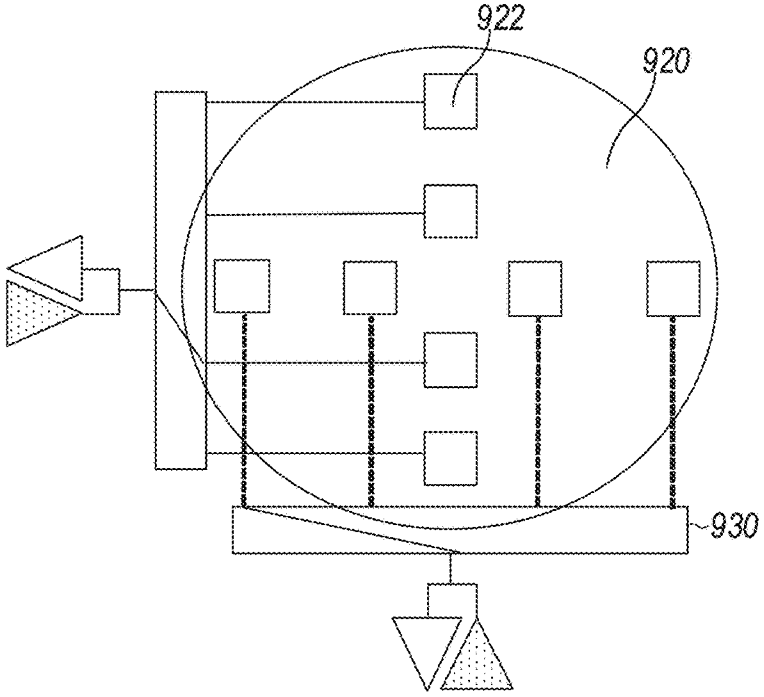
FIG. 9B illustrates 2D scanning in an antenna module in accordance with some aspects.

FIGS. 9A and 9B illustrate 2-D scanning (E and H planes) in an antenna module in accordance with some aspects. FIGS. 9A and 9B illustrate a plan view of the arrangement of FIG. 8. In particular, the antenna module 900 shown in FIG. 9A contains the lens 910 described above (either a multi-layer Saucer lens or a multi-ring FZP lens) and example substantially linear radiating elements 920 arranged in an overlapping grid on different layers of the package. The lens 910 may have a substantially circular plan view. Note that although linear radiating elements 920 are shown, other linear-like or elongated shapes may be used to provide a higher directivity, such as a curved (e.g., bowling pin) shape, zig-zag shape or a dipole-exciting higher-order spherical mode. The linear radiating elements 920 extend the same length—essentially the majority of the diameter of the lens 910 (as above, approximately 10 mm×10 mm). The linear radiating elements 920 may be longer than a conventional half-wave-length dipole, which may create a directive beam. The rectangular linear radiating elements 920 are only provided as an example; in other embodiments radiating elements having other shapes in which one dimension is substantially larger as the other (e.g., at least twice as big) may be used. Note that while all of the lens examples provided herein are two-dimensional, in some embodiments a 1-D lens nay be used.

The linear radiating elements 920 may be activated by separate switching elements 930, one for each direction of the grid (i.e., an X-direction switching element and a Y-direction switching element, as shown in FIG. 9A). The switching elements 930 may be implemented in the PCB. As shown, the linear radiating elements 920 may be connected with a power amplifier 942 when the linear radiating elements 920 are used for transmission and with a low noise amplifier 944 when the linear radiating elements 920 are used for reception. The use of the switching elements 930 allows the antenna to be driven by a single RF chain. Each switching element 930 may be independently controlled to activate a single switching element 920. The lens 910 may act to defocus the radiation emitted along the length direction of each linear radiating elements 920 and focus the radiation emitted along the width direction of each linear radiating elements 920. Accordingly, although the transmission by each linear radiating element 920 alone might result in a 1-D focused beam, the effect of the lens 910 in the different directions coupled with the activation of different linear radiating elements 920 in perpendicular directions is to adjust the radiation emitted from the lens 910 to provide a 2-D focused beam distribution. That is, the long and skinny, linear focal source shown in FIG. 9A may create a 1-D beam through the lens (the long-side of the linear focal source creates a narrow-beam from the source antenna, but the lens broadens the beam) while the skinny-side is the opposite (the broad beam narrows or focuses through due to the lens)—which, when the two orthogonal linear antennas are combined in the different layers, a 2-D scannable or sectorized beam is created.

The arrangement shown in FIG. 9B is similar to the arrangement shown in FIG. 9A, except that patch antennas 922 are placed on the same layer rather than the linear radiating elements 920 on two layers. In this case, only one of the switching elements 930 is used to activate each patch antenna 922 (rather than selection of linear radiating elements 920 using both switching elements 930 as shown in FIG. 9A). Note that a number of patch antennas 922 may be added to the arrangement of FIG. 9B to provide similar illumination as the arrangement of FIG. 9A. However, while control of the radiation may be improved in FIG. 9B compared with the arrangement of FIG. 9A due to the localization of the patch antennas 922, in some embodiments it may be challenging to implement the arrangement of FIG. 9B due to the increased number of connections to feed the patch antennas 922 via the switching elements 930.

In some embodiments, to obtain a finer beam switching resolution in the arrangement of FIG. 9B, the transceiver (not shown) may be able connect to two or more elements 922 at a time with weighted summation. As the element antennas can be linearly combined, antenna beam synthesis techniques based on antenna array factor, Chebyshev polynomials, etc may be used to generate the individual weights. This may, provide flexibility in defining an overall radiating pattern to enhance gain at a desired direction and/or to deemphasis at the direction of interference. The weighted summation may be provided through a variable attenuator or variable-gain power amplifier (PA) and/or low noise amplifier (LNA). Effectively, this can statically or dynamically change the field-of-view (FOV) of the lens. For simplicity, the weighted sum may only implement coarse weights entirely in the passive network (not shown) or through a variable-gain amplifier. While this can be extended to more elements, practical considerations may limit usefulness beyond two elements.

Since the embodiments shown in FIGS. 9A and 9B only use a single transceiver chain, digital pre-distortion may, be straightforward to implement. With phased arrays, which use multiple transceiver chains, the variation in saturated power over the transceiver chains due to Process, Voltage and Temperature (PVT) variations when fabricating the elements used in the transceiver chains and VSWR can be 3 dB or more. Further compounding the difficulties in matching the transceiver chains, the AM-AM and AM-PM non-linearity of the transceiver chains may be different.

In some embodiment, each switching element 930 may be a multi-pole multi-throw switch. The switching element 930 may be optimized to be absorbed into the designs of a power amplifier (PA) and/or low noise amplifier (LNA) used in the transceiver chain associated with the antenna array. In this case, the PA may be put in a Instate mode when inactive, thereby eliminating the use of series switches. Alternatively, the switching element 930 may be disposed before the signal is supplied to the independent LNA/PA modules.

Figure 9C:
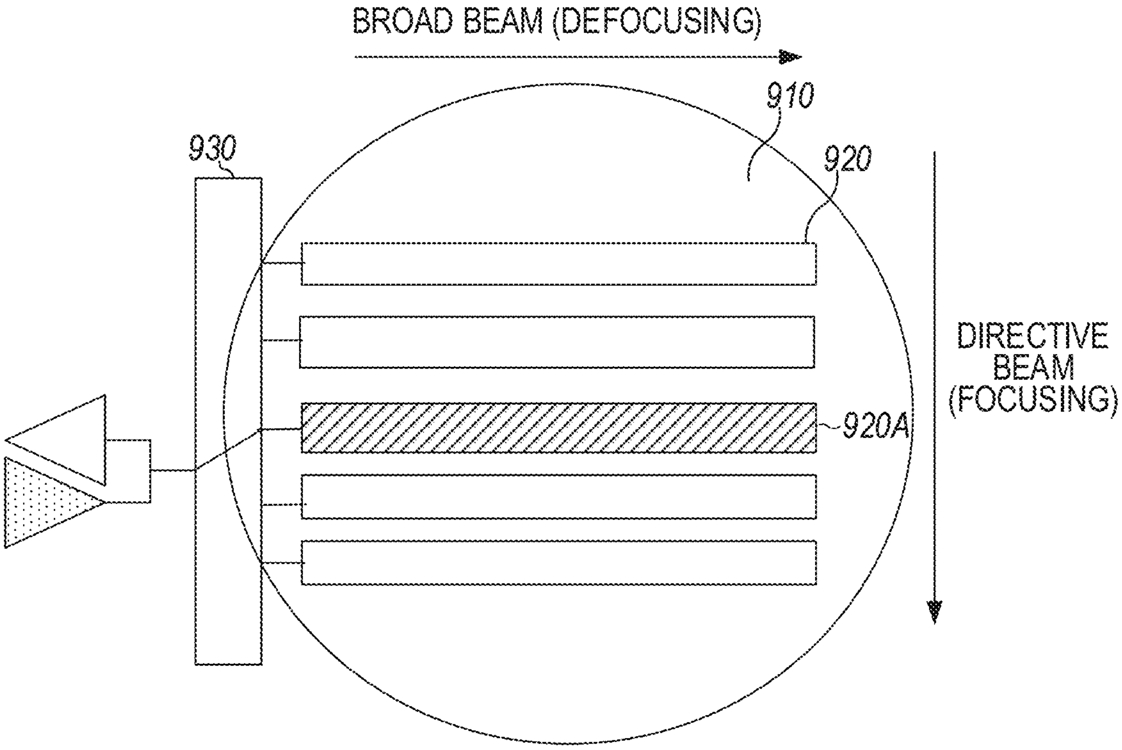
FIG. 9C illustrates one dimensional (1-D) scanning in an antenna module in accordance with some aspects.

FIG. 9C illustrates 1-D scanning in an antenna module in accordance with some aspects. As can be seen, in the 1-D embodiment, only a single switching element 930 may be used to activate the linear radiating elements 920. As above, the use of the switching element 930 allows the antenna to be driven by a single RF chain.

The lens 910 may act to defocus the radiation emitted along the length direction of each linear radiating elements 920 and focus the radiation emitted along the width direction of each linear radiating elements 920 to provide a broad beam and directive beam as shown in FIG. 9C. As in FIG. 9A, the linear radiating elements 920 may be longer than a half-wave-length dipole, thereby creating a directive beam. In some embodiments, the 1-D structure may be able to leverage the lens shape (e.g., elliptical) to provide and may at the same time also support dual-polarization.

In more detail, the lens 910 may collimate the phase of the source beam for focusing. In general, when a far-field lens (i.e., located at a far-field distance from the radiation source), either the electric or magnetic field may be used for the phase collimation. As soon as one of the electric or magnetic fields is collimated, the other of the electric or magnetic field is collimated because E and H fields are tightly coupled though "constant" free-space wave impedance (377 Ohms) and E and H fields are orthogonal to each other. Thus, a lens at the far field distance is straightforward to enable the support of dual polarization. However, for a near-field lens (i.e., having a focal length<wavelength of the radiation), enabling dual-polarization with a single lens may be difficult because E and H fields are not orthogonal to each other and the angle between E and H fields change over distance. As a result, the wave impedance changes over distance as well. Thus, two lenses with different focal distances may be used, but resolving interactions between these two lenses (one lens for each polarization) are also challenging issues because, in a sense, the two lenses are stacked vertically and one lens for one polarization should be transparent to the other lens for the other polarization. The use of a single lens for near-field dual-polarization is complicated and uses a non-intuitive lens design process.

Figure 9D:
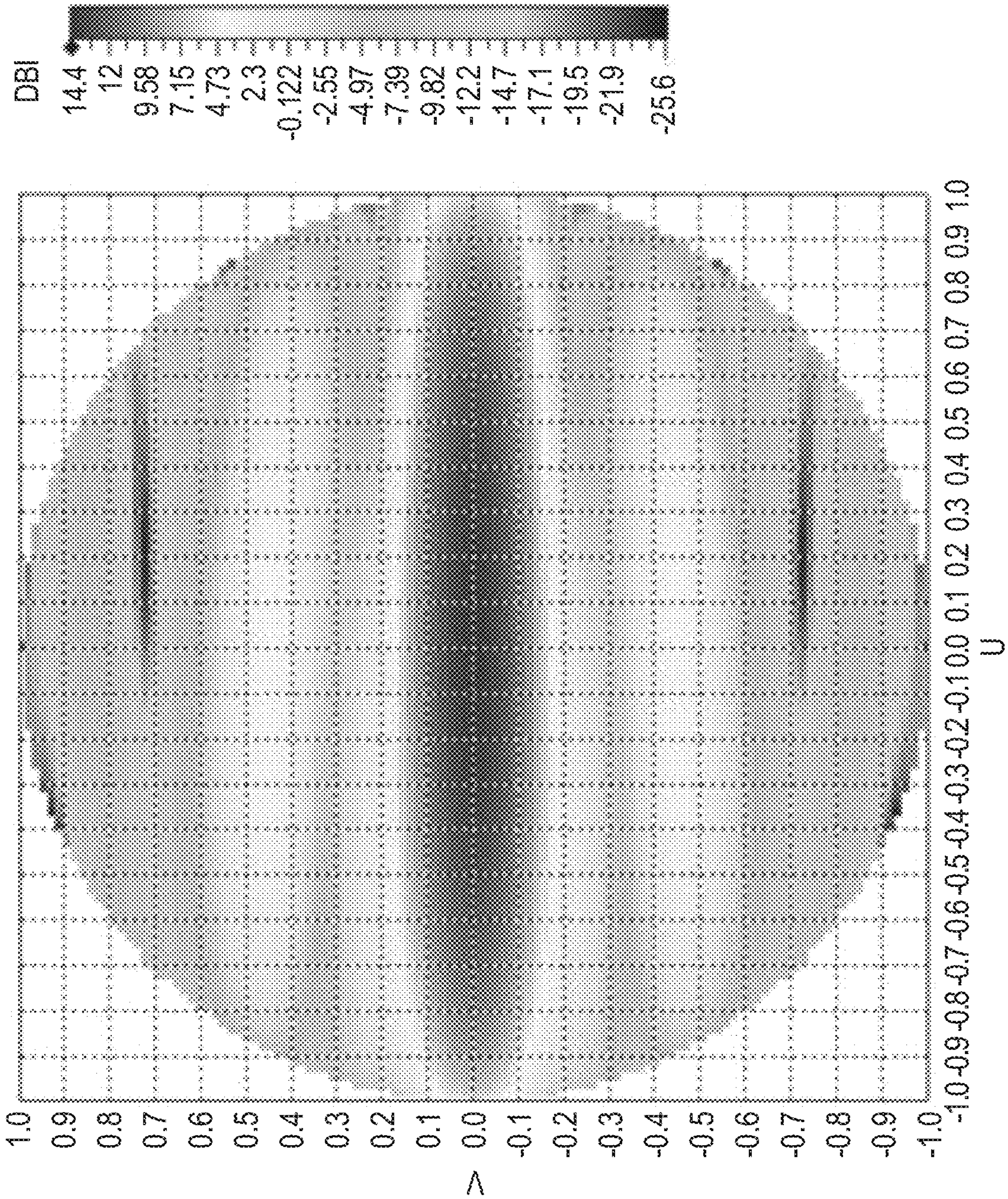
FIG. 9D illustrates a radiation pattern in accordance with some aspects.

FIG. 9D illustrates a radiation pattern in accordance with some aspects. In particular, FIG. 9D illustrates an example radiation pattern of a circular lens in uv-coordinates when the center radiating element 920*a* of FIG. 9C is selected. By selecting a different radiating element 920, the beam can be scanned across the structure shown in FIG. 9C.

Figure 9E:
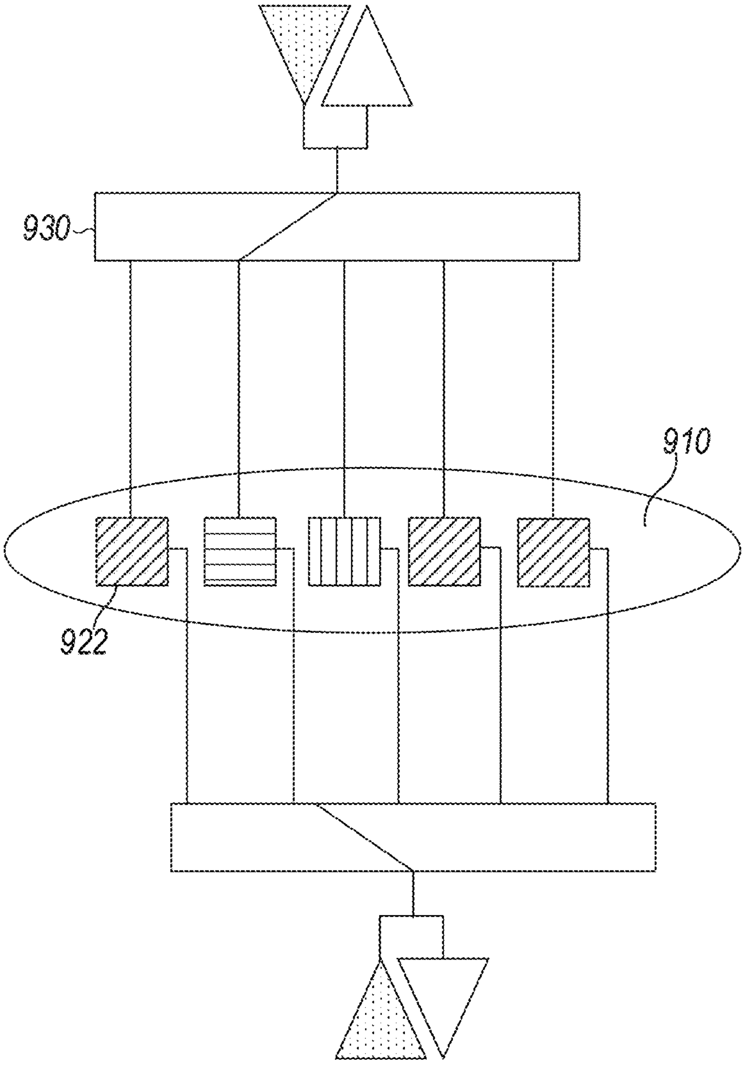
FIG. 9E illustrates 1-D scanning in an antenna module in accordance with some aspects.

Although the 1-D beam shown in FIG. 9C is based on the structure shown in FIG. 9A, in other embodiments the 1-D beam may be based on the structure in FIG. 9B. This is shown in FIG. 9E, which illustrates 1-D scanning in an antenna module in accordance with some aspects. In FIG. 9E, each set of patch antennas 922 (below the lens 910) may be driven by a single switching element 930. Although the switching elements 930 shown in FIG. 9E are disposed on opposite sides of the patch antennas 922 and the lens 910, the placement of the switching elements 930 may be dependent on the circuit board design in which the patch antennas 922 are incorporated.

Figure 9F:
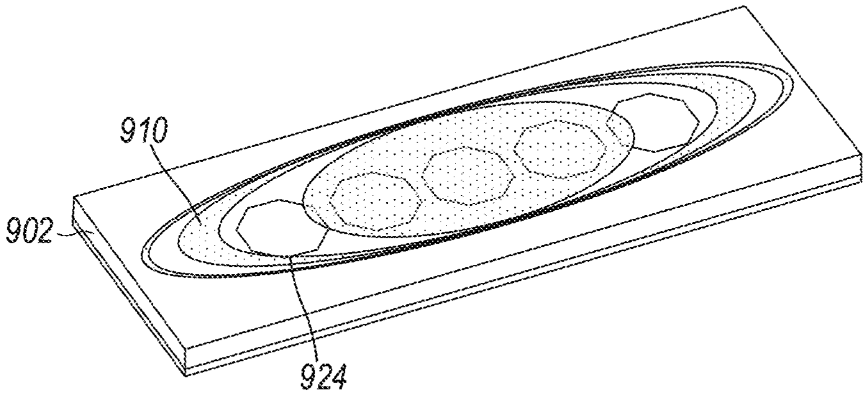
FIG. 9F illustrates a perspective view of the array shown in FIG. 9E in accordance with some aspects.
Figure 9G:
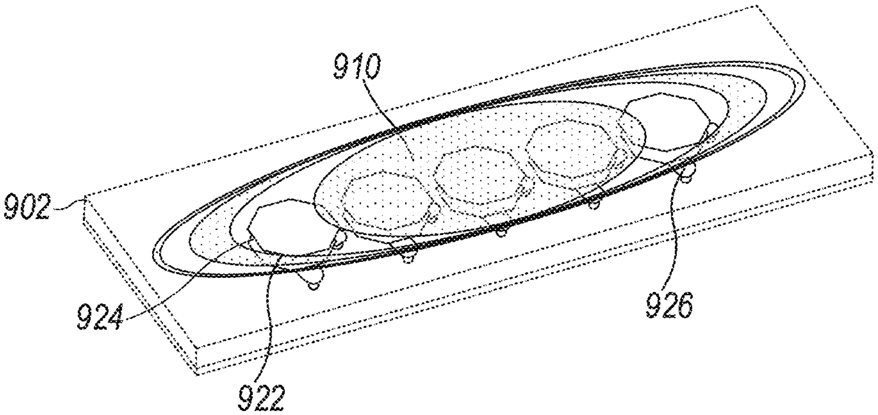
FIG. 9G illustrates another perspective view of the array shown in FIG. 9E in accordance with some aspects.

FIGS. 9F and 9G illustrate perspective views of the array shown in FIG. 9E. In particular, FIG. 9F illustrates a structure 902 (such as a circuit board or dielectric layer) on which an elliptical FZP lens 910 is disposed. The elliptical FZP lens 910 has a central ellipse with two rings of progressively smaller thickness. In FIG. 9F, the sub-10-GHz WiFi radiating elements (not shown) may lie above the FZP lens 910. The patch antennas 922 and coupled patch antennas 924 may lie on an opposite side of the FZP lens 910, as shown in FIG. 9G and described in more detail above to form a dual-polarized array. The patch antennas 922 may be microstrip antennas that are able to be fed in perpendicular directions (as illustrated in FIGS. 9E and 9G); the patch antennas 924 may be parasitic (capacitive) elements that broaden the operational frequencies to, e.g., 57-71 GHz. The patch antenna 922 and corresponding patch antenna 924 are below FZP lens 910. Each patch antenna 924 is coupled with a corresponding patch antenna 922 to broaden the bandwidth.

As is clearly shown in FIGS. 9F and 9G, the elliptical FZP lens 910 is larger in both length and width than the patch antennas 922 and 924 and the sub-10-GHz WiFi radiating elements (not shown), but is generally of similar size as the patch antennas 922 (or 924) and the sub-10-GHz WiFi radiating elements (not shown). That is the elliptical FZP lens 910 is relatively compact. FIG. 90 also shows the antenna feed structure 926 connected with the patch antennas 922. The antenna feed structure 926 may support dual polarization. Note that in other embodiments, an elliptical Saucer lens may be used rather than the FZP lens shown. When the Saucer lens is used, the sub-10-GHz WiFi antenna may be below the lens (corresponding to the embodiment shown in FIG. 3). Thus, in some embodiments, the mmW WiFi antenna in FIG. 3 may be a dual-polarized antenna similar to the above.

Figure 9H:
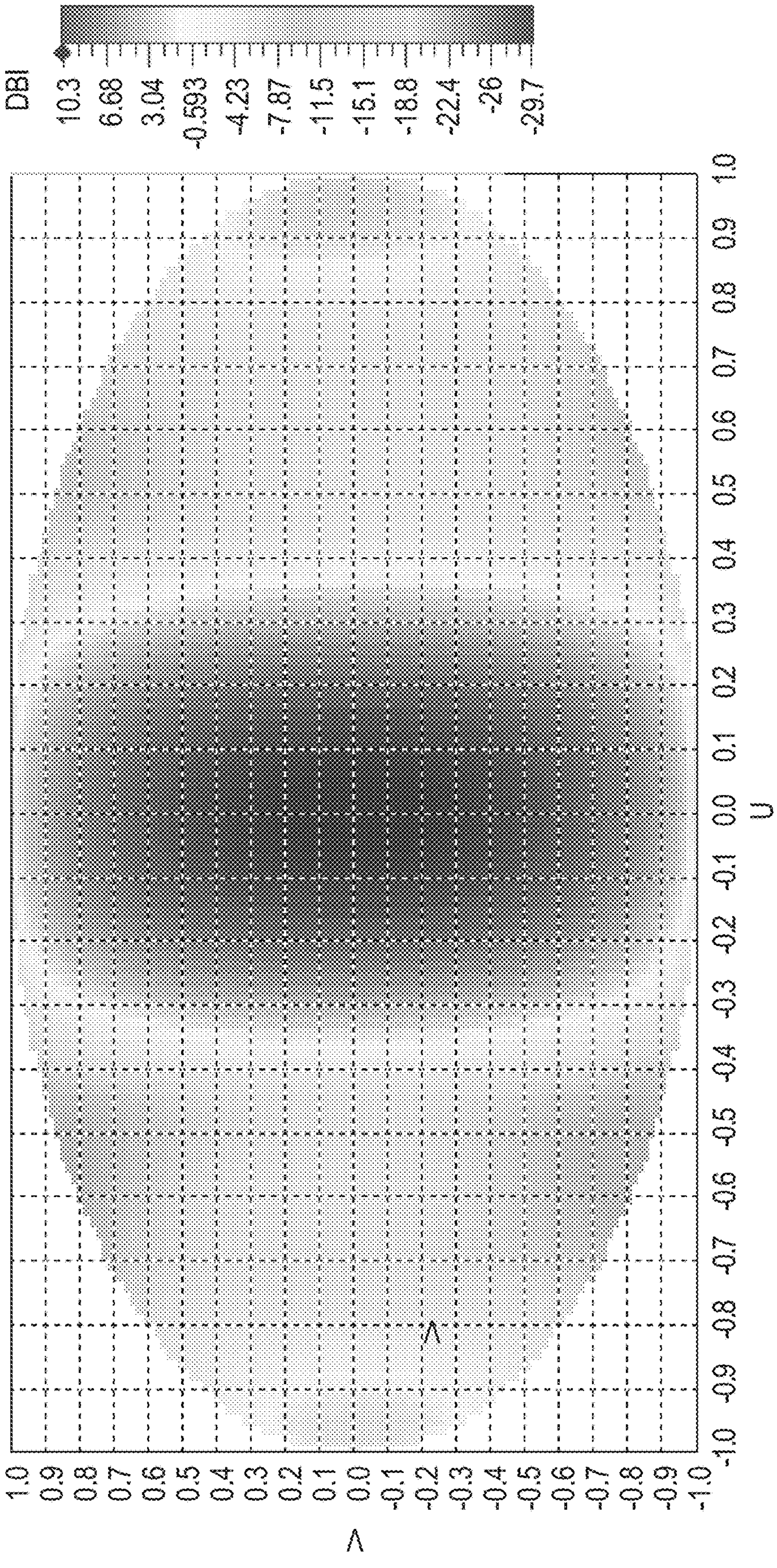
FIG. 9H illustrates a radiation pattern in accordance with some aspects.

FIG. 9H illustrates a radiation pattern in accordance with some aspects. In particular, FIG. 9H illustrates a radiation pattern of the elliptical FZP lens with a dual-polarization (theta and phi polarizations) focal source in uv-coordinates when theta-polarization of the center antenna element (e.g., the third radiating element of FIG. 9G) is selected. As is apparent from FIG. 9), a symmetrical radiation pattern is obtained in both the u and v directions.

As a spectrum offload mechanism, mm-wave WiFi may support high order modulations (64 Quadrature amplitude modulation (QAM) Orthogonal frequency-division multiplexing (OFDM) and beyond), over wide channel bandwidths (multiple carrier aggregated 320 MHz channels). Digital pre-distortion may be used in order to meet the TX error vector magnitude (EVM) for these constellations and bandwidths while operating at lowest possible back-off. While the use of a switch incurs insertion loss, the elimination of gain stages to overcome the loss of phase shifters as well as the improvement in back-off allow the embodiments described herein to operate at similar or better efficiency than a phased array. Practical implementations of the switch as distributed elements in the TX. RX and termination of the radiating element can further mitigate this loss.

Other examples of antenna elements that can be used to couple mm-wave signals into the lens, as well as design and optimization of a representative optical lens based on a compressed Luneburg lens are presented below.

Figure 10A:
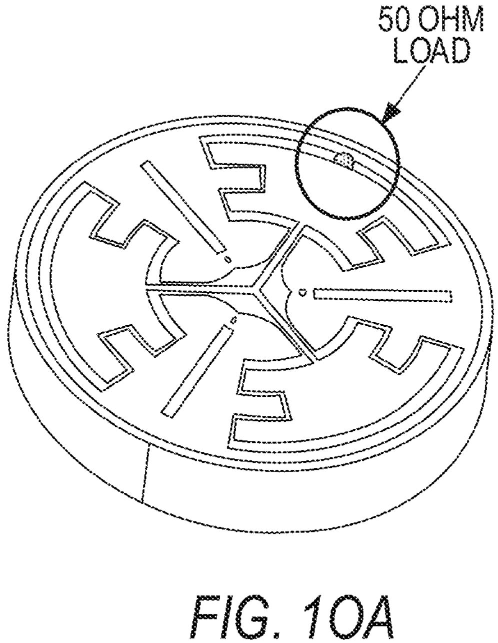
FIG. 10A illustrates a Universal Flush Mounted (UFM) antenna in accordance with some aspects.

FIG. 10A illustrates a UFM antenna in accordance with some aspects. In some embodiments, a UFM antenna may be a candidate focal source for the mmW lens, e.g., as shown in FIGS. 3 and 4. The UFM antenna may be able to offer a wide beam width with compact form factor. As shown, the UFM antenna may have a circular arrangement in plan view with discrete radiating elements (as shown in FIG. 10A, three), one of which is terminated by a 500 load. The number of discrete radiating elements, in other embodiments, may be 2, or 4 or more.

Figure 10B:
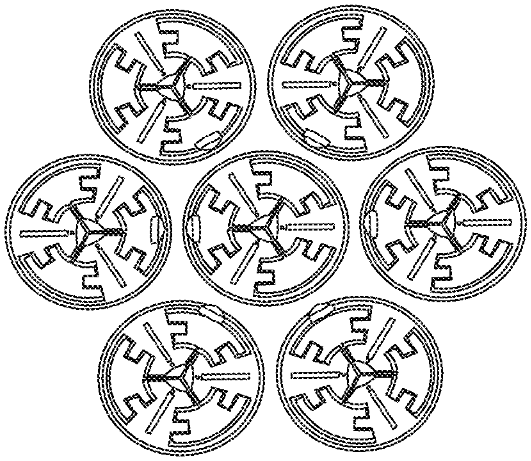
FIG. 10B illustrates an array of UFM antennas in accordance with some aspects.

The UFM antenna may also be easy to scale to an array configuration. FIG. 10B illustrates an array of UFM antennas in accordance with some aspects. The array may be disposed, for example, in a hexagonal close packing (HCP) configuration as shown, although other configurations may be used. The array, as above, may be disposed within the metal enclosure shown in FIGS. 3 and 4 at (or near) the focal length of the lens and the UFM antennas may be fed by a single RE chain as described above in relation to FIGS. 9A and 9B.

Figure 10C:
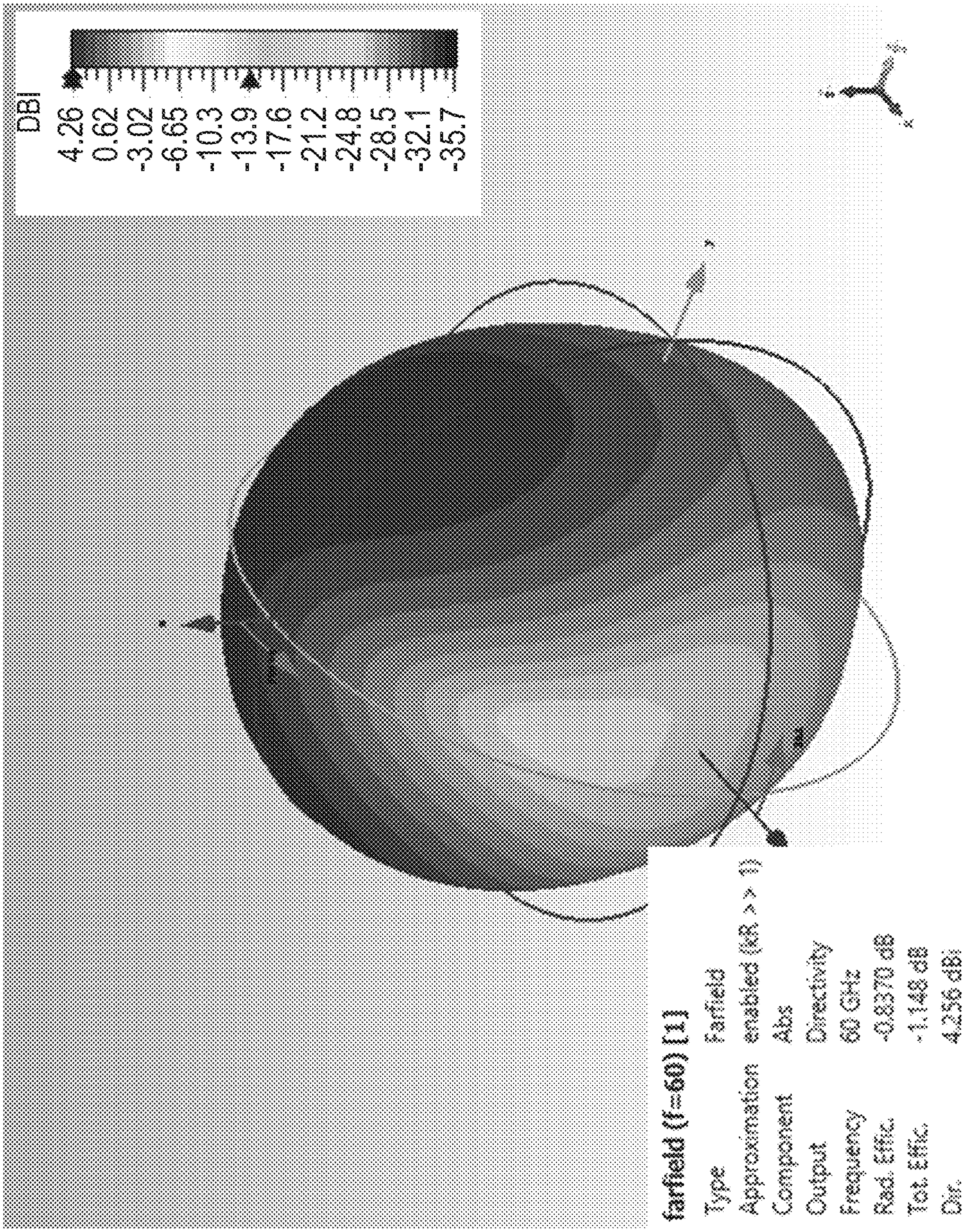
FIG. 10C illustrates a simulated radiation pattern of a UFM antenna in accordance with some aspects.

By adding the 50Ω load to one of radiating elements in the UFM antenna, the radiation pattern changes from a omni-directional antenna to a unidirectional pattern with about 180 degree half-power beam width (HPBW). FIG. 10C illustrates a simulated radiation pattern of a UFM antenna in accordance with some aspect. In particular, FIG. 10C shows the 3-D radiation pattern of the UFM antenna at 60 GHz; as one of the radiating elements is terminated with a 50Ω load, the radiation pattern covers a hemisphere of the UFM antenna substantially uniformly. The UFM antenna is thus able to provide a relatively broad beam that may enable beam steering of a lens antenna with high antenna directivity. The metal cavity of the UFM antenna may permit robust lens performance even in situations in which the antenna array is placed on top of a metal structure of lens antenna assemblies.

Figure 11:
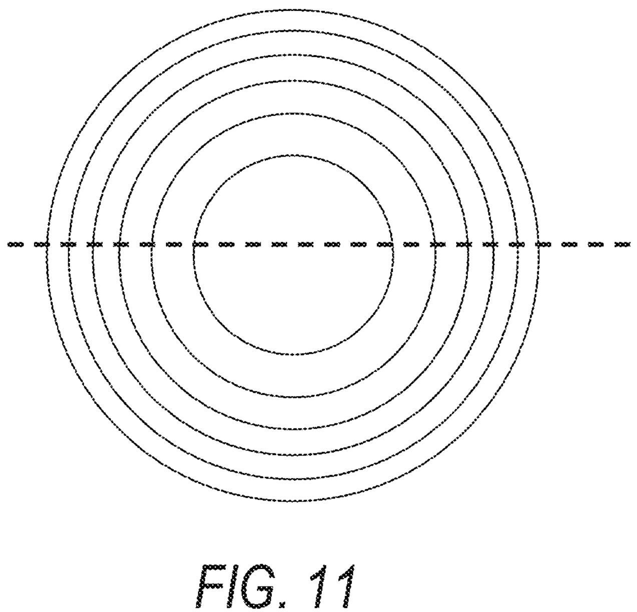
FIG. 11 illustrates a cross-sectional view of a Luneburg lens in accordance with some aspects.

Rather than the FZP lens described above, an optical lens design may be used to provide focusing. One such optical lens design may be a Luneburg lens. FIG. 11 illustrates a cross-sectional view of a Luneburg lens in accordance with some aspects. As illustrated, a Luneburg lens is a spherically symmetric, gradient-index lens with dielectric layers. That is, as shown, a Luneburg lens is a normally layered structure of discrete concentric shells, each of which is formed from a uniform isotropic material that has a different refractive index to form a stepped refractive index profile. In some embodiments, the Luneburg lens may have seven lavers, for example, with the outermost layer being a hidden air layer. In some embodiments, the Luneburg lens may use one or more Gradient-index (GRIN) materials.

A Luneburg lens may be used due to superior beam focusing capabilities with an infinite number of focal points. However, the Luneburg lens has a relatively bulky spherical form factor, which makes it difficult to use in mobile UE applications rather than mobile base stations or repeaters. The minimum lens size using a Luneburg lens design results in a lens that has more than a 20 mm focal length for 60 GHz signals, which is too thick to be used in mobile platforms (in mobile devices). In addition, as discussed above, a hemispherical lens used for 60 GHz signals may have a 95 mm radius and a focal length of 109 mm*sqrt(permittivity). Such a lens and focal length may again be much too large to use in mobile applications.

Figure 12:
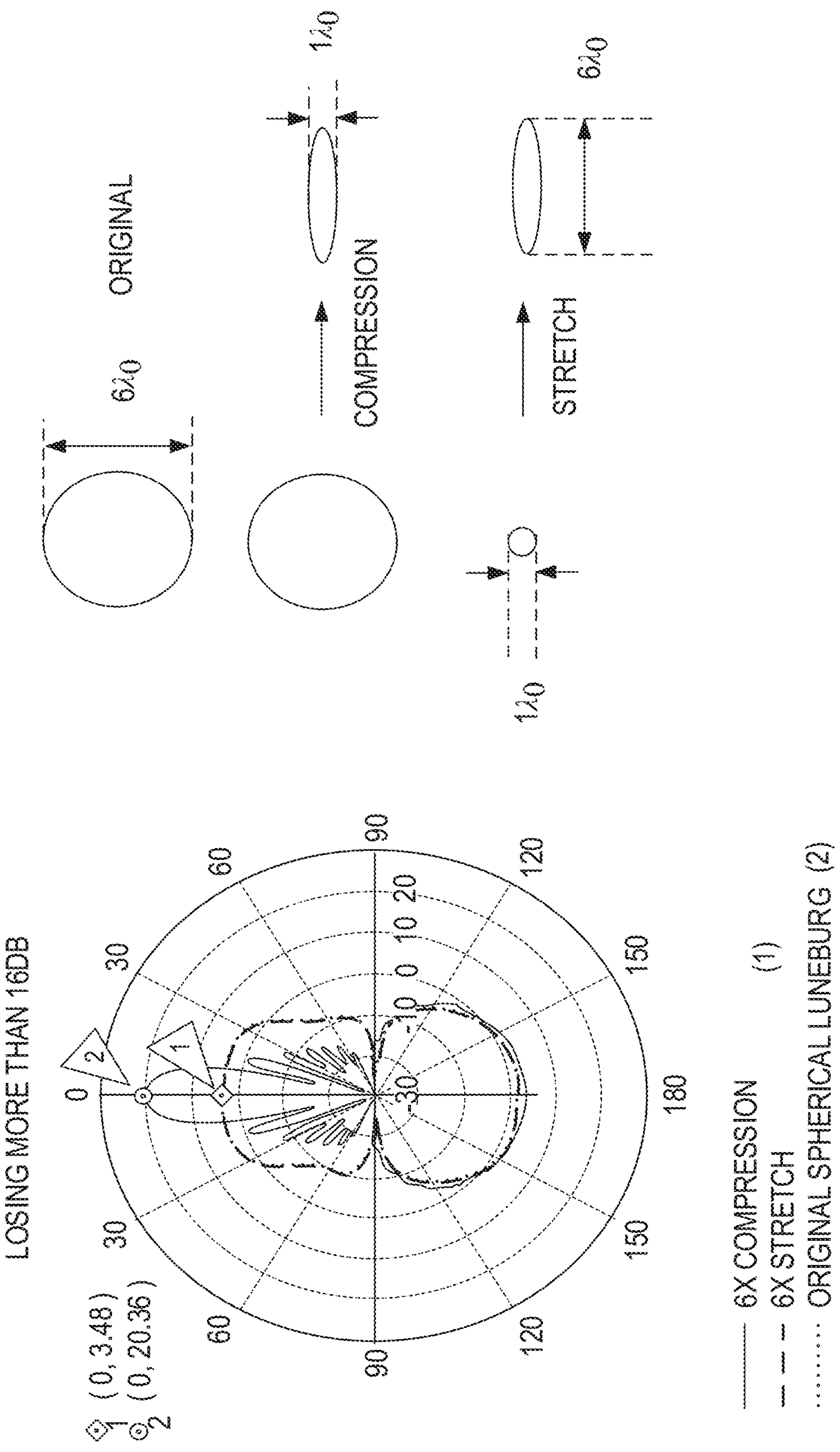
FIG. 12 illustrates Luneburg lens compression and stretch in accordance with some aspects.

Thus, it is desirable to obtain a low-profile Luneburg lens to obtain the focusing capabilities at the desired focal point. However, simple geometry compression or stretch of the Luneburg lens to produce the low-profile lens may lead to significant performance degradation. FIG. 12 illustrates Luneburg lens compression and stretch in accordance with some aspects. In particular, FIG. 12 illustrates examples of 6-wavelength-size compression or stretching of a Luneburg lens to form the low-profile lens. As shown, whether the Luneburg lens is compressed or stretched, the resulting transmission may result in a significant loss of more than 16 dB; that is, the compressed/stretched Luneburg lens may wind up essentially barely operating as a lens.

To combat this loss, the refractive index profile of the Luneburg lens may be carefully designed. One way to achieve the refractive index profile of the Luneburg lens to achieve a low-profile mmW lens is to use transformation electromagnetics and metamaterials. The challenges, such as prohibitive cost, in synthesizing the properties of engineered materials and/or obtaining broadband performance may however limit adoption of such materials in real-world applications such as their use in mobile devices.

Figure 13:
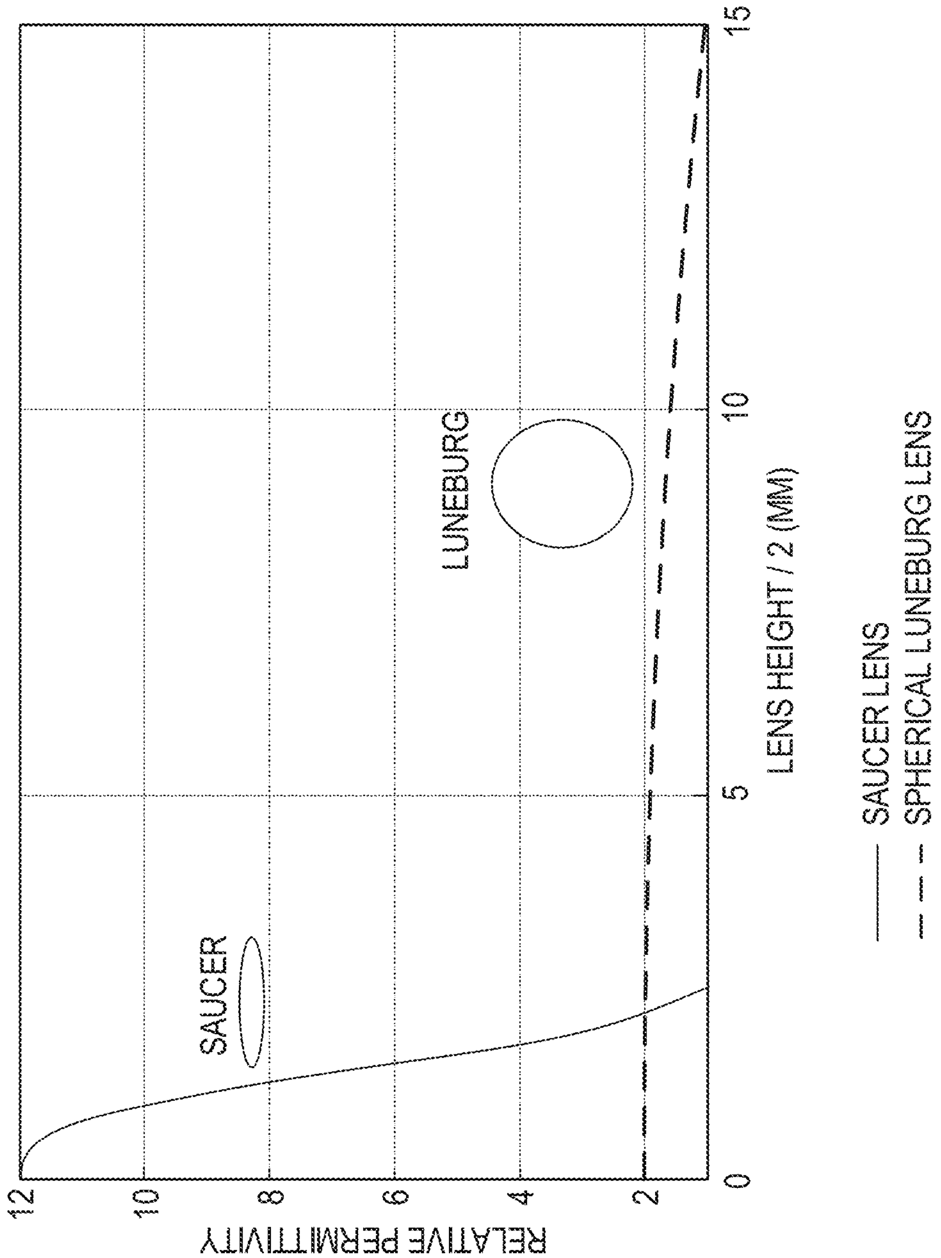
FIG. 13 illustrates a refractive index profile comparison between Saucer and Luneburg lenses in accordance with some aspects.

Instead, a refractive index profile may be designed to compress the Luneburg lens, to form an optical lens referred to as a Saucer lens. That is, the Saucer lens, as described below, may have a profile that is more than 6 times smaller than a Luneburg lens with a same focal length as the Saucer lens. FIG. 13 illustrates a refractive index profile comparison between Saucer and Luneburg lenses in accordance with some aspects. As illustrated in FIG. 13, the Luneburg lens may have a relatively flat relative permittivity that varies over the height of the Luneburg lens between about 2 and 0 to avoid impedance mismatch at each lens layer. Specifically, the relative permittivity at the center of the Luneburg lens is about 2, reaches about 1 about ⅔ of the way to the edge of the Luneburg lens, and reaches 0 at the edge of the Luneburg lens at about 15 mm; that is, the relative permittivity over the majority of the Luneburg lens remains relatively constant. In contrast, the relative permittivity of the Saucer lens may change relatively linearly over the height of the Saucer lens, from about 12 (at the center of the Saucer lens) to 0 (at the edge of the Saucer lens) at about 2.5 mm. As the example shown in FIG. 12, the height of the Saucer lens is significantly less than that of the Luneburg lens, as shown by about a scaling factor of 6.

Figure 14A:
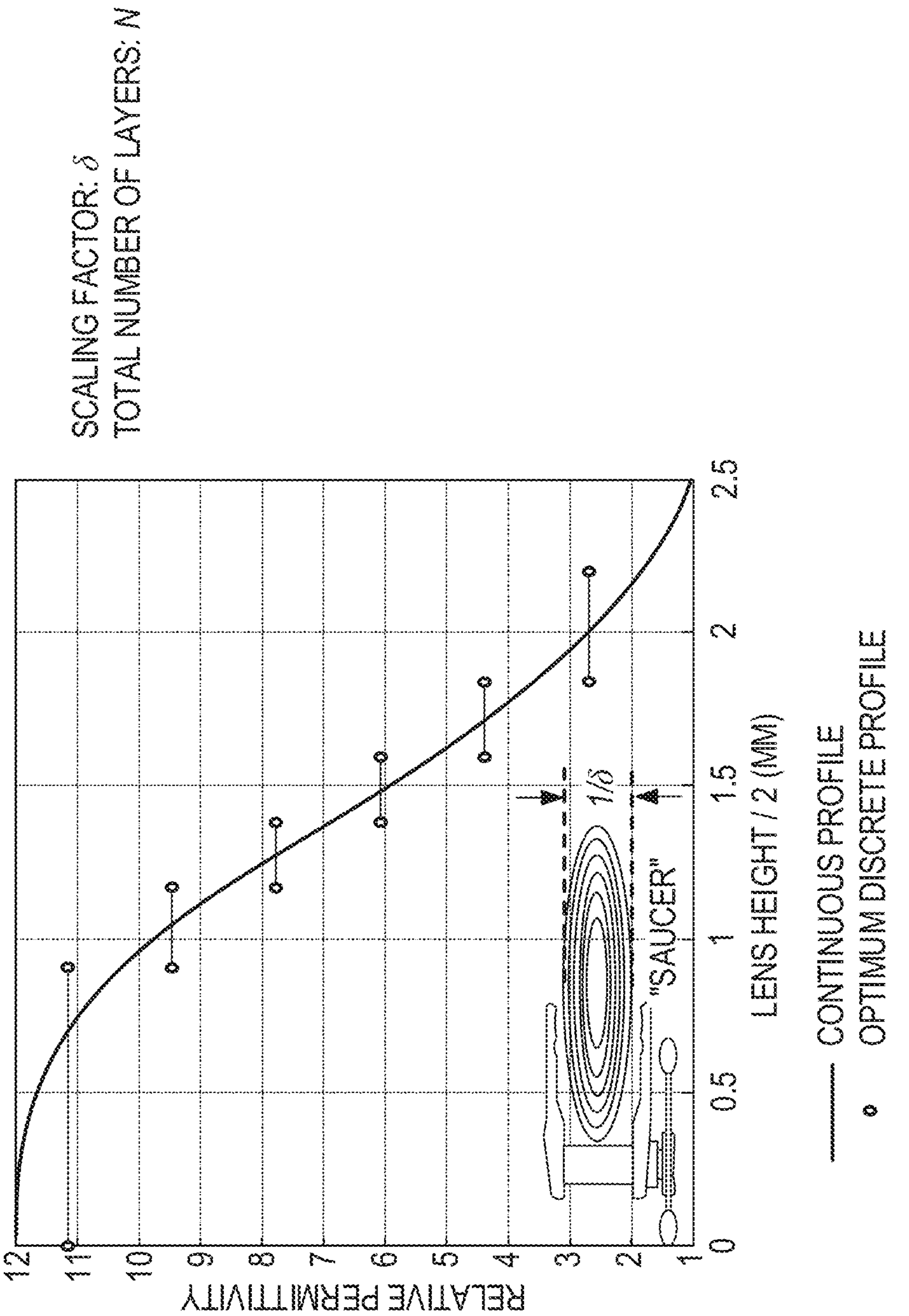
FIG. 14A illustrates optimum discrete permittivity of a Saucer lens vs. lens height in accordance with some aspects.

FIG. 14A illustrates optimum discrete permittivity of a Saucer lens vs. lens height in accordance with some aspects. The Saucer lens takes into consideration the impedance match at the lens layers, which this is embedded in the optimum design equations. FIG. 14B illustrates Saucer lens equations in accordance with some aspects, that is, analytically optimized design equations for discrete refractive index profile for the profile example shown in FIG. 13. In particular, the equations not only achieve the lens profile compression desired, but also consider the impedance mismatch at each layer employing a high-order function in the denominator of the relative permittivity profile equation. As shown, for a scaling factor δ and a total number of layers (shells) N, the continuous refractive index profile ($\varepsilon_r^{th}(r)$) is given as the following equation:

$$\varepsilon_r^{th}(r) = \frac{\delta}{(\delta - 1)r^4 + 1}[2 - r^2]$$

where r is the radius. The optimum discrete permittivity ($\varepsilon_{r,i}^{opt}$) for each layer i and optimum radius ($r_i^{opt}$) of each shell may be obtained through analytic optimization process. These parameters may be determined from:

$$\varepsilon_{r,i}^{opt} = 2\delta - (2i - 1)M,\ i = 1, 2, \ldots, N$$

-continued $$r_i^{opt} = \sqrt{\frac{-\delta + \sqrt{\delta^2 + 4(\delta - 1)(\varepsilon_{r,i}^{opt} - M)(2\delta - \varepsilon_{r,i}^{opt} + M)}}{2(\delta - 1)(\varepsilon_{r,i}^{opt} - M)}}$$

where $$M = \frac{2\delta - 1}{2N + 1}.$$

Note that the equations above provide the optimal (or target) values for the parameters. Depending on the manufacturing capabilities, the actual parameters of the Saucer lens may vary slightly (e.g., less than a few %) from these values.

The optimum discrete refractive index is shown by the vertical lines along the continuous refractive index curve in FIG. 14A for each layer of the Saucer lens. The thickness of layers of the Saucer lens may have different thicknesses, as illustrated in FIG. 14A. In some embodiments, the focal length of the Saucer lens may be around 15 mm, although this distance may be able to be reduced. Thus, the overall dimensions of the antenna structure using the Saucer lens may be reduced compared to the antenna structure using the Luneburg lens due at least in part to the size difference between the Saucer lens and the Luneburg lens. In some embodiments, the use of a Saucer lens may reduce the profile of the lens by a factor of at least about 6 compared with a Luneburg lens.

Each shell of the Saucer lens may be formed from the same material as another shell but a different density of deliberately-introduced impurities (such as air bubbles/holes/voids) whose main purpose is to vary the refractive index as desired to provide the focus effects. In some embodiments, a single-material Saucer lens can be manufactured by 3-D printing technologies. During printing, various sizes and/or densities of small voided areas may be added to each shell, with the sizes and/or densities differing between shells.

Figure 15:
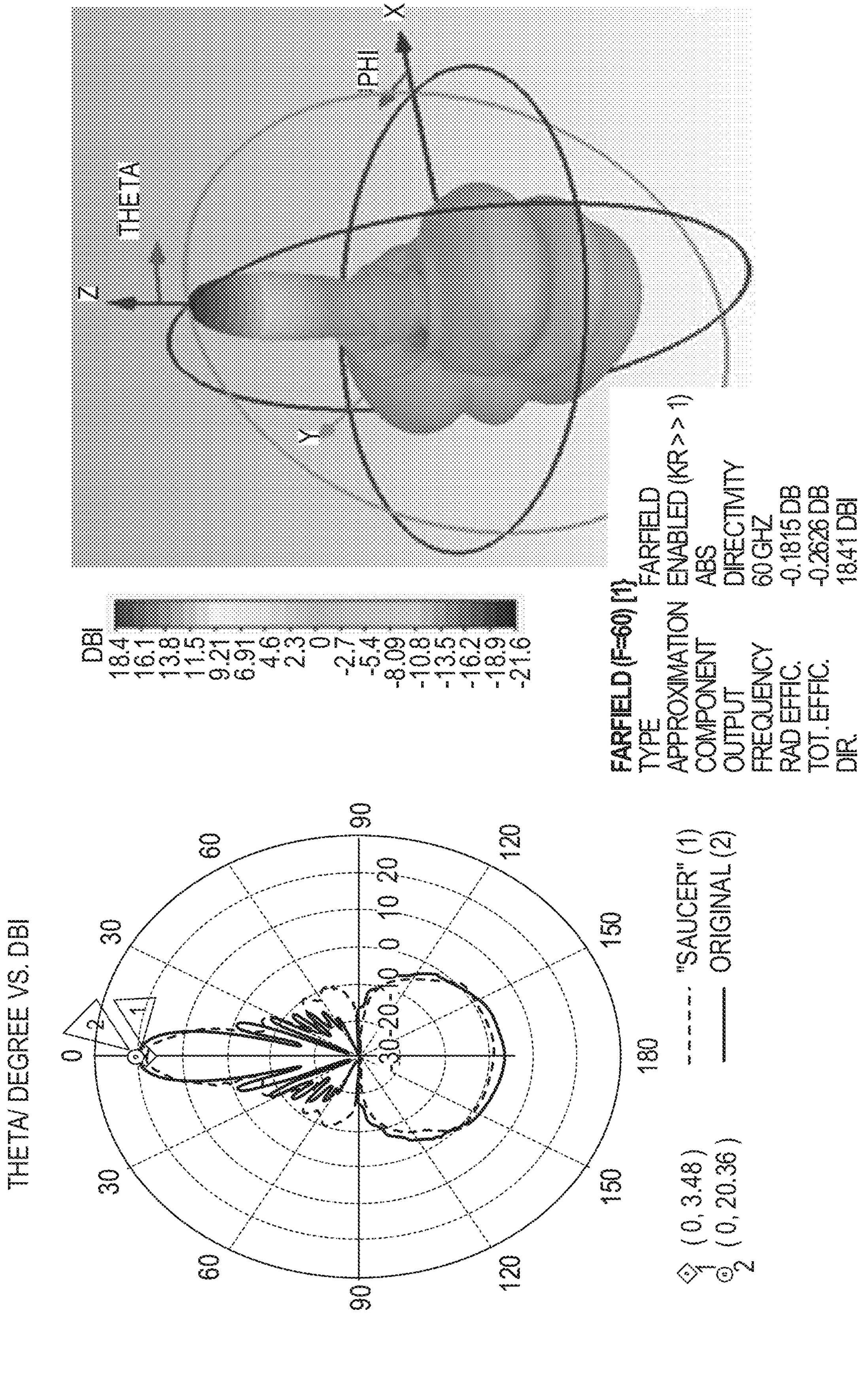
FIG. 15 illustrates a radiation pattern comparison between Saucer and Luneburg lenses in accordance with some aspects.

The performance of the Saucer lens was evaluated using full-wave 3D EM simulations. FIG. 15 illustrates a radiation pattern comparison between Saucer and Luneburg lenses in accordance with some aspects. As illustrated by the radiation pattern comparison, the simulation shows that a. Saucer lens with 6-fold compression only loses about 2 dB, compared to a full-size spherical Luneburg lens. This is a significant improvement compared to the 16 dB loss with simple compression or stretch of the Luneburg lens shown in FIG. 12.

Figure 16A:
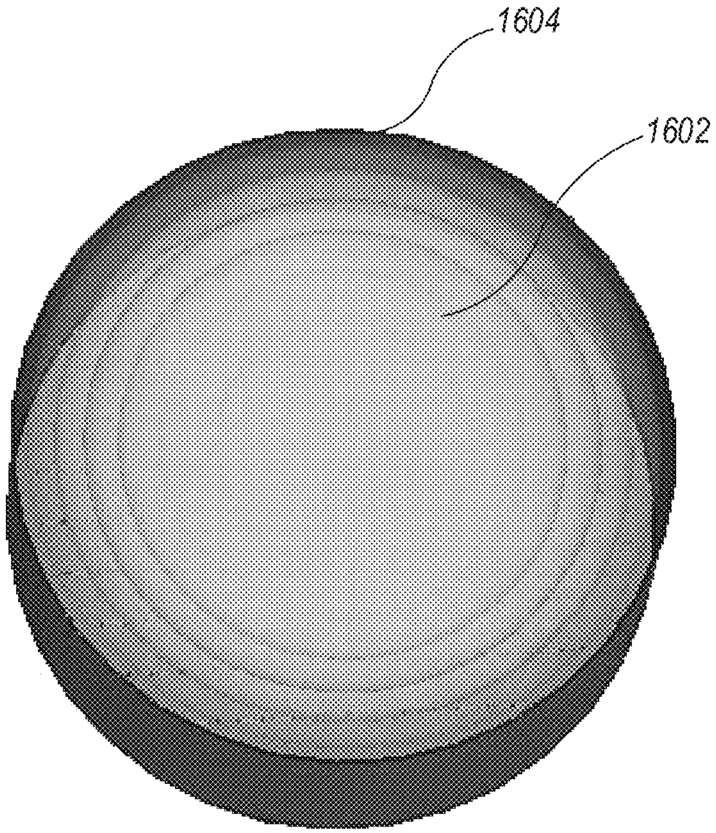
FIG. 16A illustrates a Saucer lens in accordance with some aspects.
Figure 16B:
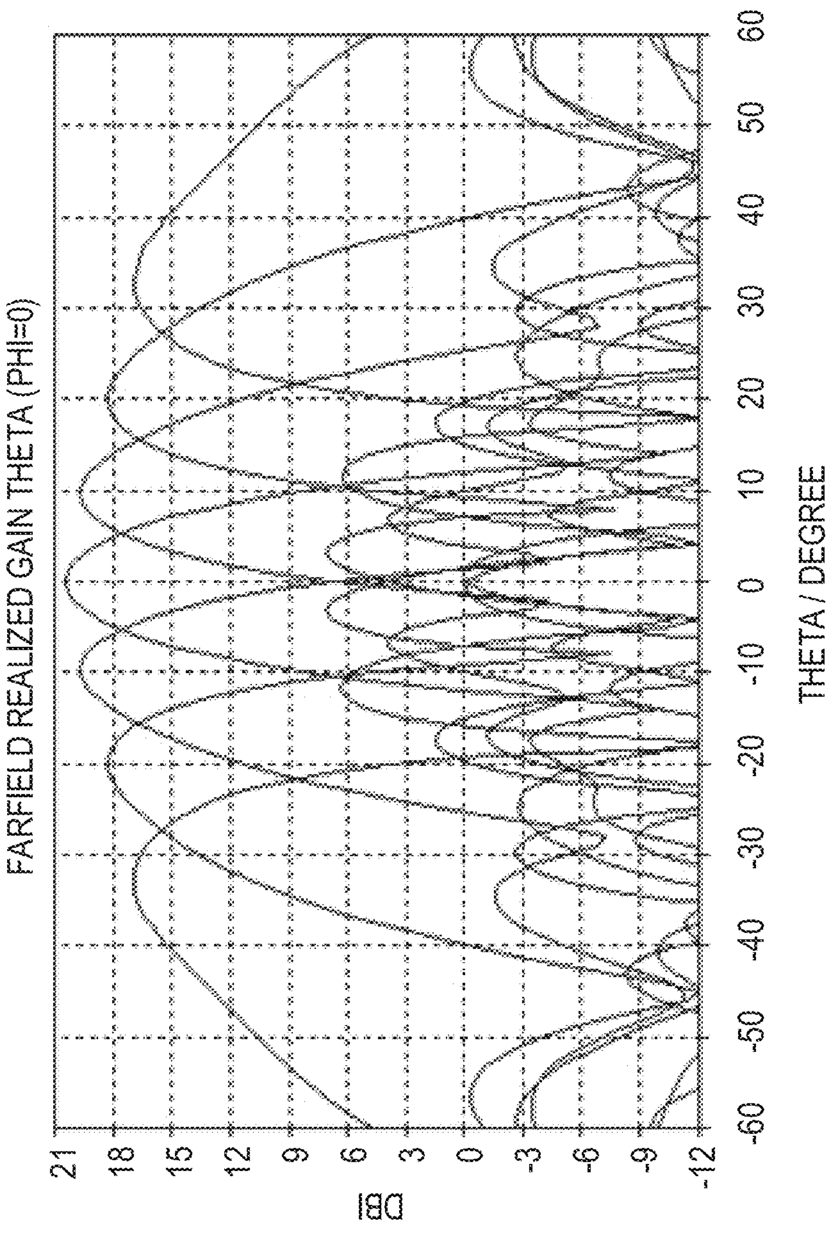
FIG. 16B illustrates beam scanning using a Saucer lens in accordance with some aspects.
Figure 16C:
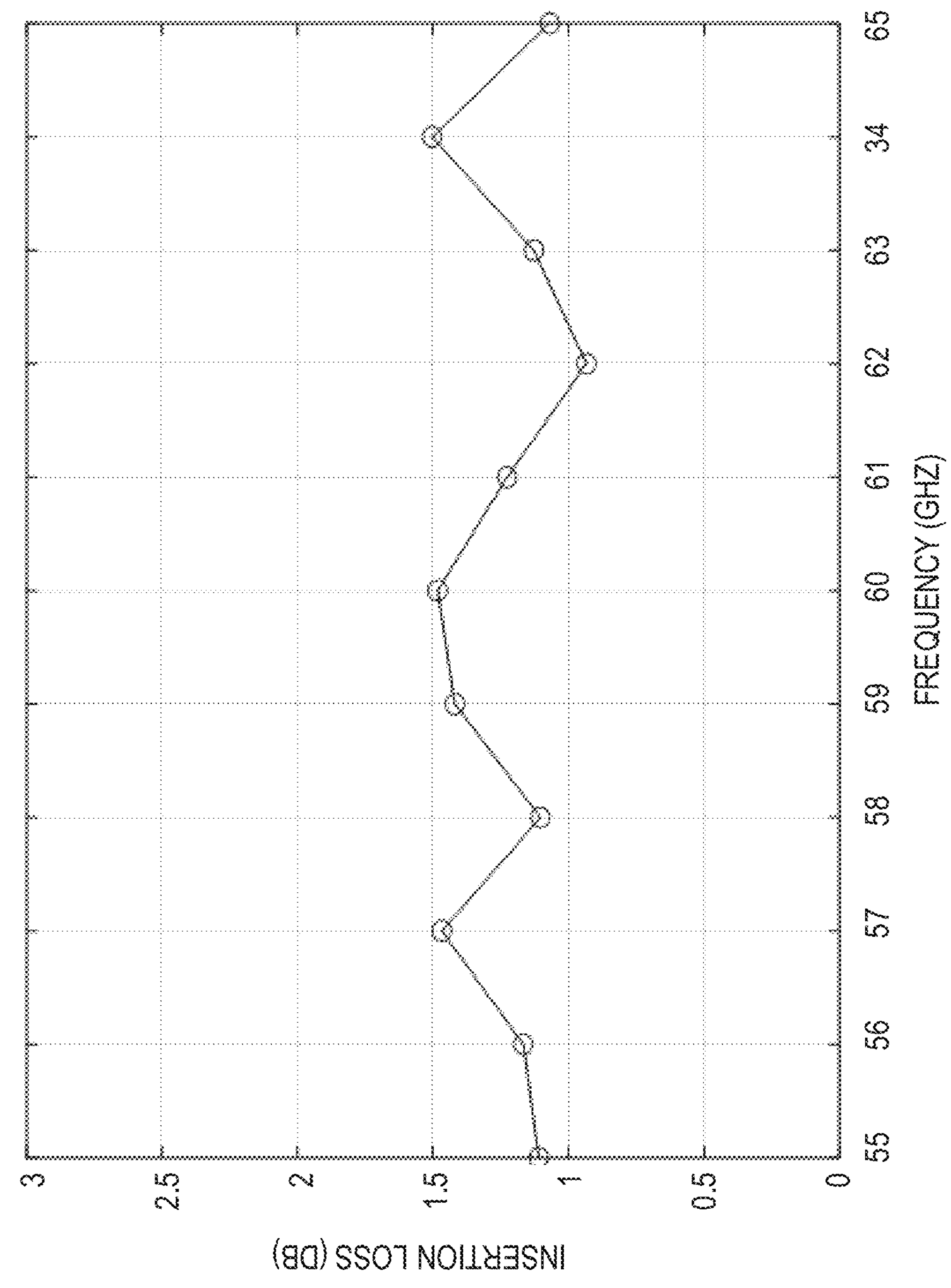
FIG. 16C illustrates estimated lens insertion loss of a Saucer lens in accordance with some aspects.

Further simulations are shown in FIGS. 16A-16C. In particular, FIG. 16A illustrates a Saucer lens in accordance with some aspects; FIG. 16B illustrates beam scanning using a Saucer lens in accordance with some aspects; and FIG. 16C illustrates estimated lens insertion loss of a Saucer lens in accordance with some aspects. The Saucer lens 1062 shown in FIG. 16A may be disposed on a metal cavity 1604 that retains a focal source (e.g., the mm-wave antennas) as described above. The simulated far-field realized gain as a function of angle is shown in FIG. 16B. The beam scanning capability of FIG. 16B illustrates a relatively uniform gain over about 40 degrees from perpendicular (less than about a 3 dBi decrease). Specifically, as discussed above, the beam scanning illustrates the variation of gain as a single focal source is switched on for each focal source.

The estimated insertion loss of the Saucer lens shown in FIG. 16C is less than about 1.5 dB at 60-GHz ISM band (varying between about 1 dB and 1.5 dB from 55 GHz-65 GHz as shown), assuming 0.01 tangent loss of the lens material. Note that a material with a 0.01 tangent loss is relatively poor—if a radome-grade material is used as a lens, the tangent loss may be about 0.002 or less. While this is larger than the insertion loss of a diffractive lens, as shown in FIG. 7C, the far-field realized gain shown in FIG. 16B more than compensates for the insertion loss, as compared to the far-field realized gain of the diffractive lens shown in FIG. 7B. Note further that without the lens being used, a radome may be disposed between the focal source and the external environment to minimize distortion of the radiating/receiving 60-GHz beams. The addition of such a radome may also introduce insertion loss. Therefore, the insertion loss difference between the Saucer lens and use of a conventional radome may be minimal.

Accordingly, by using either an FZP lens or Saucer lens as described above may permit a reduction in the size of the array compared with a phased array structure as the individual radiating elements may be disposed closer to each other than a wavelength. In addition, by using either a FZP lens or Saucer lens the space taken up by the combination of lens and array (in the perpendicular direction from the array) may be compacted as either the distance between the FZP lens and the array is reduced to under about 5 mm (the wavelength of the mm-wave) rather than being disposed at a focal length much greater than the wavelength, or the thickness of the Saucer lens is reduced compared to a Luneburg lens while essentially retaining the focal length of the Luneburg lens (about 15 mm).

EXAMPLES

Example 1 is an apparatus comprising: an enclosure; and an antenna assembly comprising: a switched beam mm-wave antenna array having radiating elements separated by less than about half of an operational wavelength configured to be generated by the radiating elements, the switched beam mm-wave antenna array supported by a printed circuit board (PCB), the radiating elements fed by a transceiver chain that is configured to individually feed the radiating elements; a low-profile mm-wave lens configured to direct the beam and at least one of focus or defocus the beam: and a sub-10 GHz antenna configured be fed by the PCB.

In Example 2, the subject matter of Example 1 includes, wherein: the enclosure is sealed by a radio frequency (RF) window that permits propagation of RF signals at a wavelength of the sub-10 GHz antenna without significant degradation, and the low-profile mm-wave lens is disposed on the RF window.

In Example 3, the subject matter of Examples 1-2 includes, wherein: the enclosure is sealed by a radio frequency (RF) window that permits propagation of RF signals at a wavelength of the sub-10 GHz antenna without significant degradation, the PCB is disposed between the RF window and the switched beam mm-wave antenna array, the low-profile mm-wave lens is disposed on the PCB, and the sub-10 GHz antenna is disposed between the PCB and the RF window.

In Example 4, the subject matter of Examples 1-3 includes, wherein the low-profile mm-wave lens is a metal Fresnel Zone Plate (FZP) lens having a focal length of less than about twice the wavelength of the beam from the radiating elements.

In Example 5, the subject matter of Example 4 includes, wherein the focal length of the FZP lens is less than about the wavelength of the beam from the radiating elements and the radiating elements are disposed at about the focal length from the FZP lens.

In Example 6, the subject matter of Example 5 includes, wherein the FZP) lens is formed from: a center circle having a diameter larger than a length of the sub-10 GHz antenna, the switched beam mm-wave antenna array disposed below and entirely overlapping the center circle, the sub-10 GHz antenna disposed above and entirely overlapping the center circle, and a single ring encircling the circle, a length of the switched beam mm-wave antenna array being less than a diameter of the FZP lens.

In Example 7, the subject matter of Examples 1-6 includes, wherein: the radiating elements comprise a first plurality of elongated radiating elements extending in a first direction and a second plurality of elongated radiating elements extending in a second direction that is perpendicular to the first direction, the first and second plurality of elongated radiating elements arranged in an overlapping grid, and a first switching element is configured to select one of the first plurality of elongated radiating elements at a time and a second switching element is configured to select one of the second plurality of elongated radiating elements at a time, the first and second switching elements extending in perpendicular directions, the first and second switching elements configured to simultaneously respectively select the one of the first plurality of elongated radiating elements and the one of the second plurality of elongated radiating elements.

In Example 8, the subject matter of Examples 1-7 includes, wherein: the radiating elements comprise a plurality of patch radiators arranged in a grid, and first and second switching elements extending in perpendicular directions, the first and second switching elements configured to select non-overlapping sets of the patch radiators, each of the first and second switching elements configured to select one of the patch radiators at a time.

In Example 9, the subject matter of Examples 1-8 includes, times smaller than a Luneburg lens with a same focal length as the Saucer lens.

In Example 10, the subject matter of Example 9 includes, wherein for a scaling factor δ from the Luneburg lens and a total number of shells N, the Saucer lens has a continuous refractive index profile ($\varepsilon_r^{th}(r)$)

$$\varepsilon_r^{th}(r) = \frac{\delta}{(\delta-1)r^4+1}[2-r^2]$$

where r is a radius of the Saucer lens, a target discrete permittivity ($\varepsilon_{r,i}^{opt}$) for each layer i and target radius ($r_i^{opt}$) of each shell are:

$$\varepsilon_{r,i}^{opt} = 2\delta - (2i-1)M,\ i = 1, 2, \ldots, N$$

$$r_i^{opt} = \sqrt{\frac{-\delta + \sqrt{\delta^2 + 4(\delta-1)(\varepsilon_{r,i}^{opt} - M)(2\delta - \varepsilon_{r,i}^{opt} + M)}}{2(\delta-1)(\varepsilon_{r,i}^{opt} - M)}}$$

where $$M = \frac{2\delta - 1}{2N+1}.$$

In Example 11, the subject matter of Examples 9-10 includes, wherein the shells comprise a same material, each shell having a different refractive index based on at least one characteristic selected from characteristics of voids disposed within the material, the characteristics comprising a density and size of the voids disposed within the material.

In Example 12, the subject matter of Examples 1-11 includes, wherein: the radiating elements comprise a plurality of patch antennas extending in a first direction, each patch antenna having orthogonal feeds connected thereto to provide excite the patch antenna using different polarizations, and the low-profile mm-wave lens is an elliptical metal Fresnel Zone Plate (FZP) lens having a focal length of less than about twice the operational wavelength and a long axis in the first direction to permit dual polarization of the switched beam mm-wave antenna array.

In Example 13, the subject matter of Example 12 includes, wherein: each patch antenna has a parasitic element coupled thereto.

Example 14 is a mobile communication device, comprising: a metal case having a cavity; a switched beam mm-wave antenna array having radiating elements; a low-profile mm-wave lens configured to direct radiation from the radiating elements, the radiation having a wavelength, the low-profile lens being one of a metal Fresnel Zone Plate (FZP) lens having a focal length of less than about the wavelength, or a Saucer lens having a plurality of shells of different refractive indexes, the Saucer lens being a compressed Luneburg lens having a profile that is more than 6 times smaller than a Luneburg lens with a same focal length as the Saucer lens; and a radio frequency (RE) window configured to seal the cavity.

In Example 15, the subject matter of Example 14 includes, a printed circuit board (PCB) disposed in the cavity, the PCB disposed between the RF window and the switched beam mm-wave antenna array, the low-profile mm-wave lens disposed on the PCB; and a sub-10 GHz antenna disposed in the cavity and fed by the PCB, the sub-10 GHz antenna disposed between the PCB and the RE window.

In Example 16, the subject matter of Example 15 includes, wherein the FZP lens is formed from: a center circle having a diameter larger than a length of the sub-10 GHz antenna, the switched beam mm-wave antenna array disposed below and entirely overlapping the center circle, and a single ring encircling the circle, a length of the switched beam mm-wave antenna array being less than a diameter of the FZP lens.

In Example 17, the subject matter of Examples 14-16 includes, wherein for a scaling factor δ from the Luneburg lens and a total number of shells N, the Saucer lens has a continuous refractive index profile ($\varepsilon_r^{th}(r)$):

$$\varepsilon_r^{th}(r) = \frac{\delta}{(\delta-1)r^4+1}[2-r^2]$$

where r is a radius of the Saucer lens, a target discrete permittivity ($\varepsilon_{r,i}^{opt}$) for each layer i and target radius ($r_i^{opt}$) of each shell are:

$$\varepsilon_{r,i}^{opt} = 2\delta - (2i-1)M,\ i = 1, 2, \ldots, N$$

-continued $$r_i^{opt} = \sqrt{\frac{-\delta + \sqrt{\delta^2 + 4(\delta - 1)(\varepsilon_{r,i}^{opt} - M)(2\delta - \varepsilon_{r,i}^{opt} + M)}}{2(\delta - 1)(\varepsilon_{r,i}^{opt} - M)}}$$

where $$M = \frac{2\delta - 1}{2N + 1}.$$

Example 18 is an apparatus comprising: a printed circuit board (PCB); and a package containing a switched beam mm-wave antenna array having radiating elements separated by less than about a half of an operational wavelength of radiation configured to be generated by the radiating elements, the switched beam mm-wave antenna array connected with a mm-wave radio head in the cavity to feed signals to the switched beam mm-wave antenna array, the switched beam mm-wave antenna array in the cavity disposed at about a focal length of a low-profile mm-wave lens configured to direct the radiation, the low-profile lens being one of: a metal Fresnel Zone Plate (FZP) lens having a focal length of less than about the wavelength, or a Saucer lens having a plurality of shells of different refractive indexes.

In Example 19, the subject matter of Example 18 includes, GHz antenna disposed between the FZP and a RF window that seals the cavity.

In Example 20, the subject matter of Example 19 includes, wherein for a scaling factor δ from the Luneburg lens and a total number of shells N, the Saucer lens has a continuous refractive index profile ($\varepsilon_r^{th}$(r)):

$$\varepsilon_r^{th}(r) = \frac{\delta}{(\delta - 1)r^4 + 1}\left[2 - r^2\right]$$

where r is a radius of the Saucer lens, a target discrete permittivity ($\varepsilon_{r,i}^{opt}$) for each layer i and target radius $r_i^{opt}$ of each shell are:

$$\varepsilon_{r,i}^{opt} = 2\delta - (2i - 1)M,\ i = 1, 2, \ldots, N$$

$$r_i^{opt} = \sqrt{\frac{-\delta + \sqrt{\delta^2 + 4(\delta - 1)(\varepsilon_{r,i}^{opt} - M)(2\delta - \varepsilon_{r,i}^{opt} + M)}}{2(\delta - 1)(\varepsilon_{r,i}^{opt} - M)}}$$

where $$M = \frac{2\delta - 1}{2N + 1}.$$

Example 21 is a method of fabricating an antenna module, the method comprising: coupling, to a printed circuit board (PCB), a package containing a switched beam mm-wave antenna array having radiating elements separated by less than about a half wavelength of a beam transmitted by the radiating elements, the switched beam mm-wave antenna array connected with a mm-wave radio head in the cavity to feed signals to the switched beam mm-wave antenna array; inserting the PCB coupled with the package and the mm-wave radio head into a metal cavity, the switched beam mm-wave antenna array in the cavity disposed at about a focal length of a low-profile mm-wave lens configured to steer the beam, the low-profile lens being one of a metal Fresnel Zone Plate (FZP) lens having a focal length of less than about the wavelength of the beam from the radiating elements, or a Saucer lens having a plurality of shells of different refractive indexes, the Saucer lens being a compressed Luneburg lens having a profile that is more than 6 times smaller than a Luneburg lens with a same focal length as the Saucer lens; and after insertion of the PCB into the cavity, sealing the cavity using a radio frequency (RF) window.

In Example 22, the subject matter of Example 21 includes wherein a sub-10 GHz antenna is disposed in the cavity and fed by the PCB, the sub-10 GHz antenna disposed between the FZP and the RF window.

In Example 23, the subject matter of Example 22 includes wherein: the FZP lens is formed from a center circle having a diameter larger than a length of the sub-10 GHz antenna and a length of the switched beam mm-wave antenna array, the switched beam mm-wave antenna array disposed below and entirely overlapping the center circle, and a single ring encircling the circle, and the Saucer lens has, for a scaling factor δ from the Luneburg lens and a total number of shells N:

$$\varepsilon_r^{th}(r) = \frac{\delta}{(\delta - 1)r^4 + 1}\left[2 - r^2\right]$$

$$\varepsilon_{r,i}^{opt} = 2\delta - (2i - 1)M,\ i = 1, 2, \ldots, N$$

$$r_i^{opt} = \sqrt{\frac{-\delta + \sqrt{\delta^2 + 4(\delta - 1)(\varepsilon_{r,i}^{opt} - M)(2\delta - \varepsilon_{r,i}^{opt} + M)}}{2(\delta - 1)(\varepsilon_{r,i}^{opt} - M)}}$$

where $$M = \frac{2\delta - 1}{2N + 1}.$$

Example 24 is at least one machine-readable medium including instructions that, when executed by processing circuitry, cause the processing circuitry to perform operations to implement of any of Examples 1-23.

Example 25 is an apparatus comprising means to implement of any of Examples 1-23.

Example 26 is a system to implement of any of Examples 1-23.

Example 27 is a method to implement of any of Examples 1-20.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a pail hereof show, by way of illustration, and not of limitation, specific aspects in which the subject matter may be practiced. The aspects illustrated are described in sufficient detail to enable those skilled in the art to practice the teachings disclosed herein, Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
an enclosure; and
an antenna assembly comprising:
a switched beam mm-wave antenna array having radiating elements separated by less than half of an operational wavelength configured to be generated by the radiating elements, the switched beam mm-wave antenna array supported by a printed circuit board (PCB), the radiating elements fed by a transceiver chain that is configured to individually feed the radiating elements;
a low-profile mm-wave lens configured to direct a beam from the radiating elements and at least one of focus or defocus the beam, the low-profile mm-wave lens comprising a metal Fresnel Zone Plate (FZP) lens; and
a sub-10 GHz antenna configured to be fed by the PCB, the FZP lens comprising a center circle having a diameter larger than a length of the sub-10 GHz antenna.

2. The apparatus of claim 1, wherein:
the enclosure is sealed by a radio frequency (RF) window that permits propagation of RF signals at a wavelength of the sub-10 GHz antenna without significant degradation, and
the low-profile mm-wave lens is disposed on the RF window.

3. The apparatus of claim 1, wherein:
the enclosure is sealed by a radio frequency (RF) window that permits propagation of RF signals at a wavelength of the sub-10 GHz antenna without significant degradation,
the PCB is disposed between the RF window and the switched beam mm-wave antenna array,
the low-profile mm-wave lens is disposed on the PCB, and
the sub-10 GHz antenna is disposed between the PCB and the RF window.

4. The apparatus of claim 1, wherein a focal length of the FZP lens is less than twice the wavelength of the beam from the radiating elements.

5. The apparatus of claim 4, wherein the focal length of the FZP lens is less than the wavelength of the beam from the radiating elements and the radiating elements are disposed at the focal length from the FZP lens.

6. The apparatus of claim 5, wherein:
the switched beam mm-wave antenna array is disposed below and entirely overlaps the center circle,
the sub-10 GHz antenna is disposed above and entirely overlaps the center circle,
a single ring encircles the center circle, and
a length of the switched beam mm-wave antenna array is less than a diameter of the FZP lens.

7. The apparatus of claim 1, wherein:
the radiating elements comprise a first plurality of elongated radiating elements extending in a first direction and a second plurality of elongated radiating elements extending in a second direction that is perpendicular to the first direction, the first and second plurality of elongated radiating elements arranged in an overlapping grid, and
a first switching element is configured to select one of the first plurality of elongated radiating elements at a time and a second switching element is configured to select one of the second plurality of elongated radiating elements at a time, the first and second switching elements extending in perpendicular directions, the first and second switching elements configured to simultaneously respectively select the one of the first plurality of elongated radiating elements and the one of the second plurality of elongated radiating elements.

8. The apparatus of claim 1, wherein:
the radiating elements comprise a plurality of patch radiators arranged in a grid, and
first and second switching elements extending in perpendicular directions, the first and second switching elements configured to select non-overlapping sets of the patch radiators, each of the first and second switching elements configured to select one of the patch radiators at a time.

9. The apparatus of claim 1, wherein:
the radiating elements comprise a plurality of patch antennas extending in a first direction, each patch antenna having orthogonal feeds connected thereto to provide excite the patch antenna using different polarizations, and
a focal length of the FZP lens is less than twice the operational wavelength and a long axis in the first direction to permit dual polarization of the switched beam mm-wave antenna array.

10. The apparatus of claim 9, wherein:
each patch antenna has a parasitic element coupled thereto.

11. The apparatus of claim 1, wherein the transceiver chain is configured to switch between feeding the switched beam mm-wave antenna array and the sub-10 GHz antenna.

12. The apparatus of claim 1, wherein the transceiver chain is a single transceiver chain and the apparatus lacks phase shifters coupled to the radiating elements of the switched beam mm-wave antenna array.

13. An apparatus comprising:
an enclosure; and
an antenna assembly comprising:
a switched beam mm-wave antenna array having radiating elements separated by less than half of an operational wavelength configured to be generated by the radiating elements, the switched beam mm-wave antenna array supported by a printed circuit board (PCB), the radiating elements fed by a transceiver chain that is configured to individually feed the radiating elements;
a low-profile mm-wave lens configured to direct a beam from the radiating elements and at least one of focus or defocus the beam, the low-profile mm-wave lens comprising a Saucer lens having a plurality of shells of different refractive indexes, the Saucer lens being a compressed Luneburg lens having a profile that is more than 6 times smaller than a Luneburg lens with a same focal length as the Saucer lens; and a sub-10 GHz antenna configured to be fed by the PCB, wherein for a scaling factor δ from the Luneburg lens and a total number of shells N, the Saucer lens has a continuous refractive index profile ($\varepsilon_r^{th}$(r)):

$$\varepsilon_r^{th}(r) = \frac{\delta}{(\delta-1)r^4+1}\left[2-r^2\right]$$

where r is a radius of the Saucer lens, a target discrete permittivity ($\varepsilon_{r,i}^{opt}$) for each layer i and target radius ($r_i^{opt}$) of each shell are:

$$\varepsilon_{r,i}^{opt} = 2\delta-(2i-1)M,\ i=1, 2, \ldots , N$$

$$r_i^{opt} = \sqrt{\frac{-\delta+\sqrt{\delta^2+4(\delta-1)\left(\varepsilon_{r,i}^{opt}-M\right)\left(2\delta-\varepsilon_{r,i}^{opt}+M\right)}}{2(\delta-1)\left(\varepsilon_{r,i}^{opt}-M\right)}}$$

where $$M = \frac{2\delta-1}{2N+1}.$$

14. The apparatus of claim 13, wherein: the enclosure is sealed by a radio frequency (RF) window that permits propagation of RF signals at a wavelength of the sub-10 GHz antenna without significant degradation, and the low-profile mm-wave lens is disposed on the RF window.

15. The apparatus of claim 13, wherein: the enclosure is sealed by a radio frequency (RF) window that permits propagation of RF signals at a wavelength of the sub-10 GHz antenna without significant degradation, the PCB is disposed between the RF window and the switched beam mm-wave antenna array, the low-profile mm-wave lens is disposed on the PCB, and the sub-10 GHz antenna is disposed between the PCB and the RF window.

16. The apparatus of claim 13, wherein: the radiating elements comprise a first plurality of elongated radiating elements extending in a first direction and a second plurality of elongated radiating elements extending in a second direction that is perpendicular to the first direction, the first and second plurality of elongated radiating elements arranged in an overlapping grid, and a first switching element is configured to select one of the first plurality of elongated radiating elements at a time and a second switching element is configured to select one of the second plurality of elongated radiating elements at a time, the first and second switching elements extending in perpendicular directions, the first and second switching elements configured to simultaneously respectively select the one of the first plurality of elongated radiating elements and the one of the second plurality of elongated radiating elements.

17. The apparatus of claim 13, wherein:

the radiating elements comprise a plurality of patch radiators arranged in a grid, and first and second switching elements extending in perpendicular directions, the first and second switching elements configured to select non-overlapping sets of the patch radiators, each of the first and second switching elements configured to select one of the patch radiators at a time.

18. The apparatus of claim 13, wherein the shells comprise an identical material, each shell having a different refractive index based on at least one characteristic selected from characteristics of voids disposed within the material, the characteristics comprising a density and size of the voids disposed within the material.

19. The apparatus of claim 14, wherein the radiating elements comprise a plurality of patch antennas extending in a first direction, each patch antenna having orthogonal feeds connected thereto to provide excite the patch antenna using different polarizations.

20. The apparatus of claim 19, wherein:

each patch antenna has a parasitic element coupled thereto.

* * * * *